(12) United States Patent
Harthoorn et al.

(10) Patent No.: US 10,086,382 B2
(45) Date of Patent: Oct. 2, 2018

(54) MATERIAL REDUCING APPARATUS INCLUDING AN AUTOMATICALLY POSITIONED THROWN OBJECT DEFLECTOR

(71) Applicant: Vermeer Manufacturing Company, Pella, IA (US)

(72) Inventors: Duane Harthoorn, Lynnville, IA (US); Greg Williams, Pella, IA (US); Jim O'Halloran, Pella, IA (US); Jeff Bradley, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 868 days.

(21) Appl. No.: 14/640,945

(22) Filed: Mar. 6, 2015

(65) Prior Publication Data
US 2015/0251187 A1    Sep. 10, 2015

Related U.S. Application Data

(60) Provisional application No. 61/949,651, filed on Mar. 7, 2014.

(51) Int. Cl.
*B02C 25/00* (2006.01)
*B02C 21/02* (2006.01)
*A01G 23/06* (2006.01)
*B02C 18/16* (2006.01)

(52) U.S. Cl.
CPC ............ *B02C 25/00* (2013.01); *A01G 23/067* (2013.01); *B02C 21/026* (2013.01); *B02C 2018/168* (2013.01); *B02C 2021/023* (2013.01)

(58) Field of Classification Search
CPC .. B02C 25/00; B02C 21/026; B02C 2018/168
USPC ................................................ 241/101.74, 77
See application file for complete search history.

(56) References Cited

U.S. PATENT DOCUMENTS

| | | | |
|---|---|---|---|
| 5,692,689 A * | 12/1997 | Shinn ................... | A01G 23/067 144/24.12 |
| 5,794,866 A * | 8/1998 | Shinn ................... | A01G 23/093 144/24.12 |
| 5,873,227 A | 2/1999 | Arner | |
| 6,173,973 B1 | 1/2001 | Robinson | |
| 7,748,421 B2 | 7/2010 | Everett | |
| 8,528,845 B2 * | 9/2013 | Ragnarsson ............ | B02C 23/02 241/101.73 |
| 8,862,340 B2 | 10/2014 | Andruch, III et al. | |
| 8,973,862 B2 | 3/2015 | Marcus | |
| 2006/0255193 A1 * | 11/2006 | Hoekstra ............... | A01G 23/067 241/28 |
| 2008/0000208 A1 * | 1/2008 | Edwards ................ | A01G 3/002 56/7 |

(Continued)

*Primary Examiner* — Faye Francis
(74) *Attorney, Agent, or Firm* — Merchant & Gould P.C.

(57) ABSTRACT

The present disclosure relates to a material reducing apparatus adapted to be coupled to a vehicle by a pivot arm or other structure. The material reducing apparatus includes a reducing head with rotary reducing component. The reducing head can be titled about a tilt axis relative to the vehicle and can be raised and lowered relative to a vehicle. The reducing head has a thrown object deflector that automatically moves relative to the rotary reducing component when the reducing head is tilted relative to the vehicle.

20 Claims, 19 Drawing Sheets

(56) References Cited

U.S. PATENT DOCUMENTS

| | | | |
|---|---|---|---|
| 2008/0203202 A1* | 8/2008 | Clark | ............... B02C 13/09 241/101.75 |
| 2014/0224941 A1 | 8/2014 | Gitter et al. | |
| 2015/0151952 A1 | 6/2015 | Kivi et al. | |

* cited by examiner

MATERIAL REDUCING APPARATUS INCLUDING AN AUTOMATICALLY POSITIONED THROWN OBJECT DEFLECTOR

CROSS-REFERENCE TO RELATED APPLICATION

The present patent application claims the benefit of U.S. Provisional Patent Application Ser. No. 61/949,651, filed Mar. 7, 2014, which patent application is hereby incorporated by reference in its entirety.

TECHNICAL FIELD

The present disclosure relates generally to machines for reducing material. In particular, present disclosure relates to machines for reducing material that include a cover for deflecting objects thrown by the material reducing machines.

BACKGROUND

Certain types of material reducing machines include a rotating drum that carries a plurality of reducing elements. Example reducing elements include knives, cutters, blades, hammers, teeth or other structures. As the drum is rotated, the reducing elements contact material desired to be reduced (e.g., trees, tree branches, brush, grass, etc.) thereby causing the material to be reduced. Generally, material is reduced when it is reduced in size by cutting, chipping, grinding, breaking or other reducing actions. In certain examples, the reducing elements can work in combination with other structures such as screens or anvils to facilitate the material reduction process.

A forestry mower is an example of one type of material reducing machine. A forestry mower is typically coupled to a vehicle such as a tractor or skid steer vehicle. A typical forestry mower includes a rotating drum that carries a plurality of reducing blades. The drum is supported by a frame that at least partially covers a portion of the circumference of the drum. The drum and the frame can form a reducing head that is coupled to the vehicle by an arm. Typically, the reducing head can be raised and lowered relative the vehicle, and also can be pivoted forwardly and backwardly relative to the vehicle. By raising the reducing head and tilting the reducing head back, the forestry mower can be used to strip branches from trees and other areal applications. By lowering the reducing head and pivoting the reducing head forward, the forestry mower can readily be used to clear brush, branches and other material along the ground.

SUMMARY

One aspect of the present disclosure relates to a material reducing apparatus having a rotatable reducing component and a moveable thrown object deflector. In certain examples, movement of the thrown object deflector relative to the rotatable reducing component is coordinated with raising and lowering of the rotatable reducing component and/or tilting of the rotatable reducing component forwardly or backwardly. In certain examples, coordination of the movement of the thrown object deflector is accomplished through the use of a mechanical linkage. In other examples, coordination of the movement of the thrown object deflector is accomplished through the use of orientation sensors and active drives such as hydraulic or pneumatic cylinders, electric motors, hydraulic motors, pneumatic motors or other types of actuators.

Another aspect of the present disclosure relates to a material reducing machine having a reducing head that can be raised and lowered and that can also be tilted forwardly and backwardly. The material reducing apparatus includes a moveable deflector that automatically adjusts in position relative to the reducing head as the reducing head is raised or lowered or as the reducing head is pivoted forwardly or backwardly. In certain examples, the moveable deflector includes a cover that is movable relative to a fixed cover. In certain examples, the reducing head includes a rotatable reducing component mounted to a frame, and the moveable deflector includes a cover that extends along a length of the rotatable reducing component and that is moveable along guides, grooves, tracks or other structures defined by the frame. In certain examples, the moveable cover works in combination with a fixed cover of the frame. In certain examples, the moveable cover ensures that a trajectory angle of an object thrown from the reducing head will not exceed a predetermined angle with respect to horizontal. In certain examples, the predetermined trajectory angle will not exceed six degrees above horizontal regardless of the orientation of the reducing head. Of course, while six degrees is specified, different predetermined trajectory angles can be used depending upon specifics of the reducing head. In certain examples, the thrown object deflector is automatically retracted relative to the drum when the reducing head is lowered so as to provide a larger exposed circumference of the drum for reducing applications. In certain applications, the moveable deflector is automatically extended when the reducing head is raised so as to control a thrown object trajectory angle of the reducing head. In certain examples, the moveable deflector is automatically refracted relative to the rotatable reducing component as the reducing head is tilted forwardly and is automatically extended relative to the rotatable reducing component as the reducing head is tilted backwardly. In this way, the exposed circumference of the rotary reducing component is enlarged for ground applications so as to enhance reducing efficiency and is reduced for more aerial applications so as to limit or otherwise control the thrown object trajectory angle of the reducing head.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the examples disclosed herein are based.

DETAILED DESCRIPTION

The present disclosure relates generally to a material reducing apparatus having a thrown object deflector (e.g., a cover) that automatically moves to control a thrown object trajectory angle of the material reducing apparatus and also to control an amount of circumferential coverage provided about a rotary reducing component of the material reducing apparatus. In certain examples, the material reducing apparatus is configured to automatically provide increased coverage of the rotary reducing component when the material reducing apparatus is in a raised or tilted back orientation, and to provide reduced coverage of the rotational reducing component when the material reducing apparatus is in a lowered and/or tilted forward orientation. In certain examples, movement of the thrown object deflector relative to the rotary reducing component is automatically coordinated with forward and/or backward tilting of a reducing head of the material reducing component. In certain examples, movement of the thrown object deflector relative to the rotary reducing component can be automatically coordinated with raising and lowering of the head of the material reducing apparatus. In certain examples, coordinated movement of the thrown object deflector can be achieved solely by a coordinated mechanical linkage. In other examples, coordination of the movement of the thrown object deflector can be achieved through the use of various sensors and actuators that automatically reposition the thrown object deflector relative to the rotary reducing component in response to the reducing head being oriented at a particular angular orientation. In certain examples, the rotary reducing component can be supported by a frame including a fixed cover that circumferentially surrounds a portion of the rotary reducing component. In such examples, the moveable thrown object deflector is moveable relative to the fixed cover and is also moveable relative to the rotary reducing component. Such an example, movement of the moveable thrown object deflector can be coordinated so as to ensure a thrown object trajectory angle of the material reducing machines does not exceed a predetermined angle relative to horizontal regardless of the position or angular orientation of the reducing head of the material reducing machine.

Figure 1:
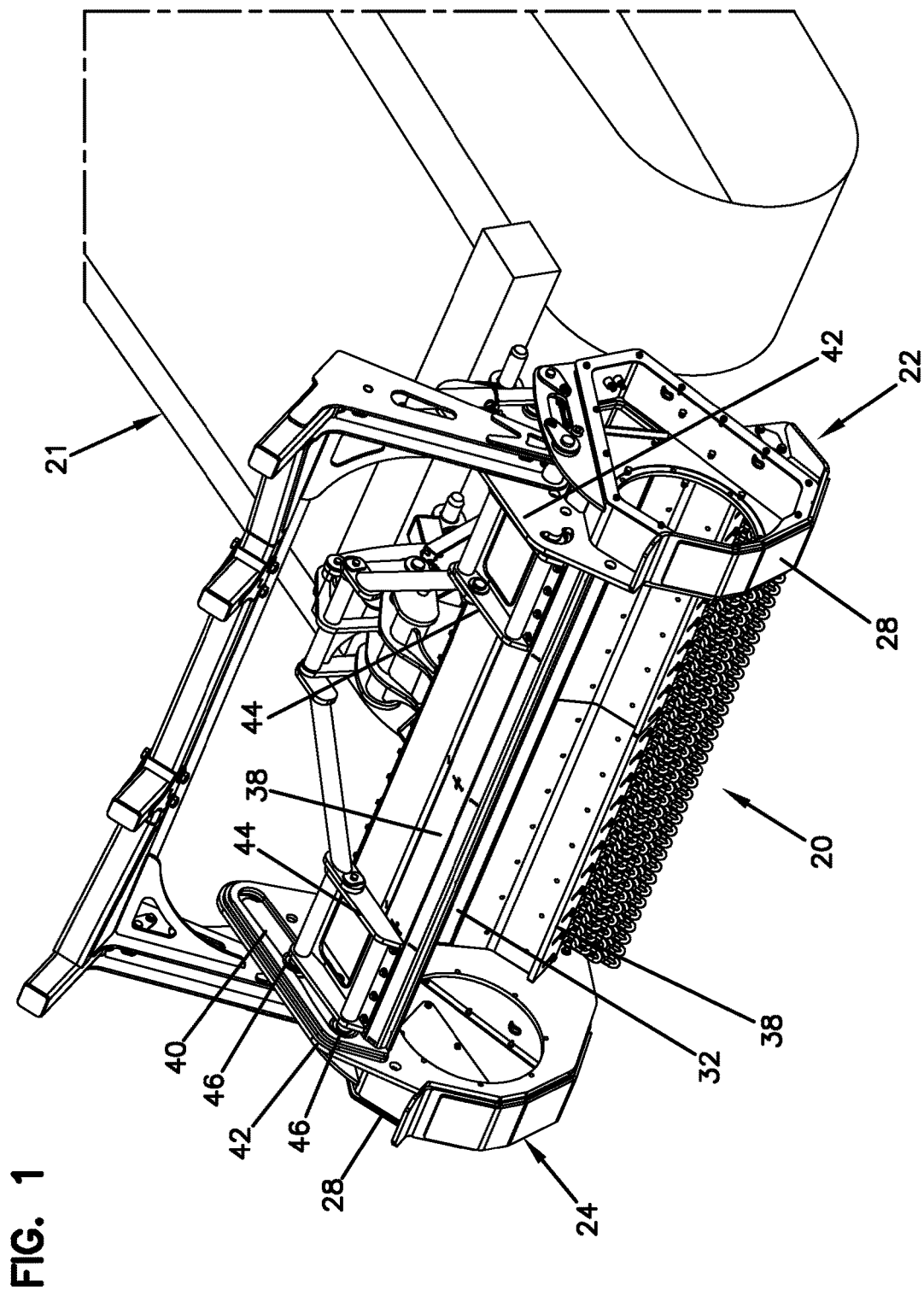
FIG. 1 is a perspective view of a material reducing apparatus in accordance with the principles of the present disclosure, a rotary reducing component such as a reducing drum of the material reducing apparatus has been omitted from the drawing.
Figure 2:
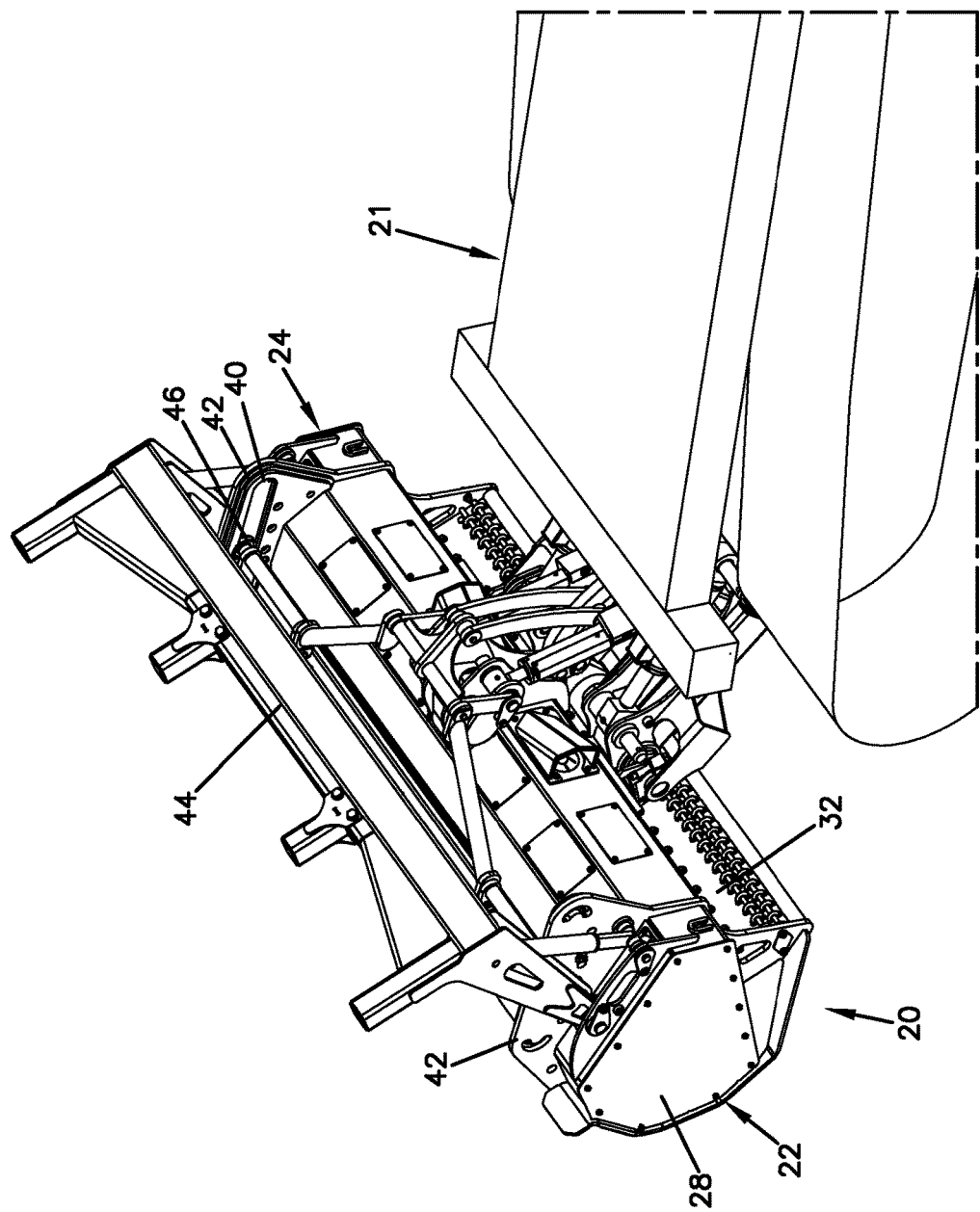
FIG. 2 is another perspective view of the material reducing apparatus of FIG. 1.

FIGS. 1 and 2 illustrate a material reducing apparatus 20 in accordance with the principles of the present disclosure. In one example, the material reducing apparatus 20 can be coupled to and powered by a vehicle 21 such as a skid steer vehicle or a tractor. In certain examples, material reducing apparatus 20 includes a reducing head 22 that can be raised and lowered relative to the vehicle 21 and also can be tilted forwardly and backwardly relative to the vehicle 21. In the depicted example, a rotary reducing component (e.g., a drum, aligned plates or other structure that carries reducing elements about its periphery) has been omitted from FIGS. 1 and 2 for clarity. In one example, the material reducing apparatus 20 can function as a forestry mower.

Figure 3:
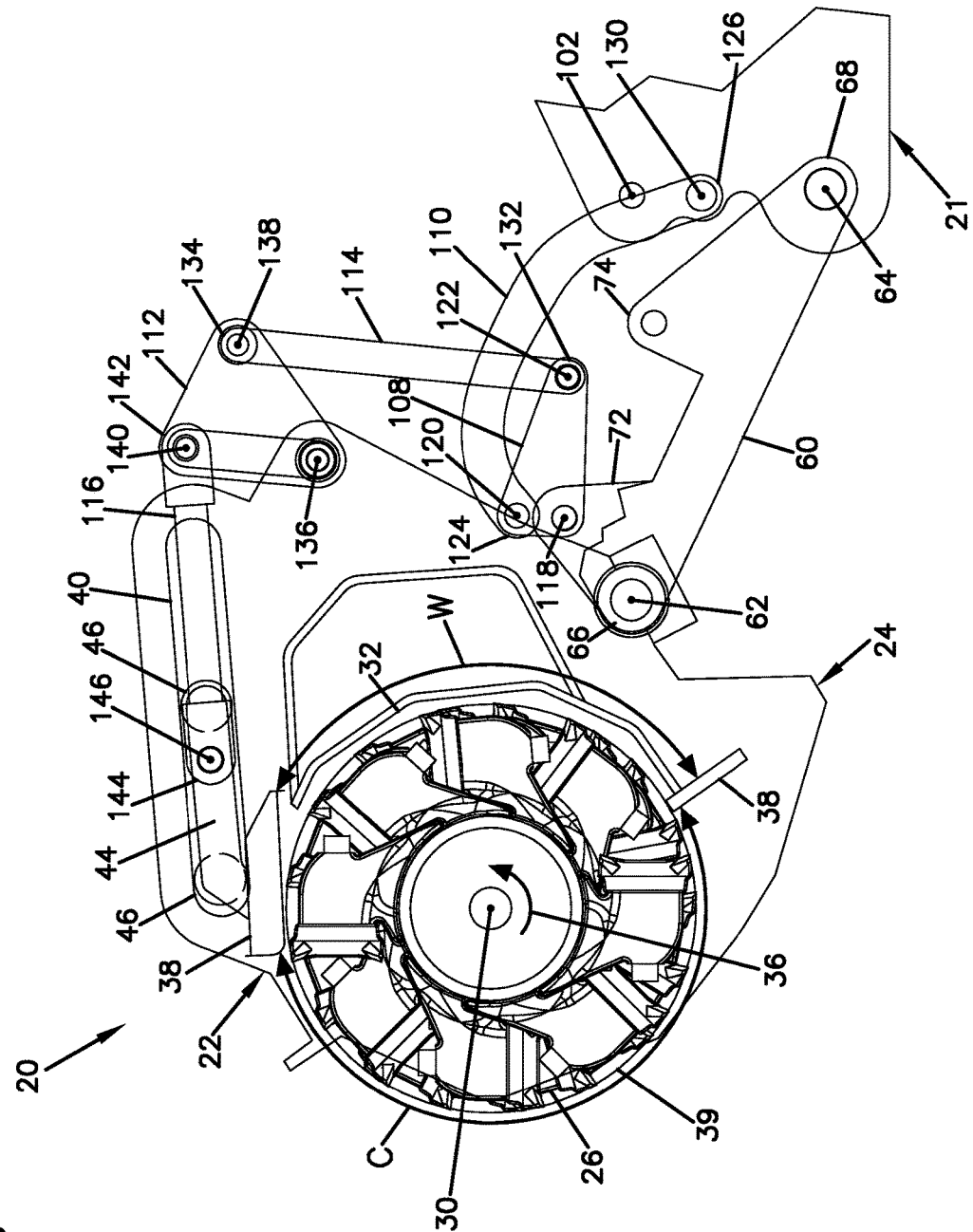
FIG. 3 is a side view of the material reducing apparatus of FIGS. 1 and 2 shown in a raised, tilted back orientation with hydraulic cylinders omitted to better show an example linkage arrangement.

Referring still to FIGS. 1 and 2, the material reducing apparatus 20 includes a frame 24 for supporting a rotary reducing component such as a drum 26 (see FIG. 3). The frame 24 includes opposite end pieces 28 that support opposite ends of the drum 26 such that the drum can rotate about an axis 30 (see FIG. 3) relative to the frame 24. In certain examples, the end pieces 28 can house bearings and a direct drive for rotatably supporting and driving the drum 26. In other examples, the rotary reducing component can be belt or chain driven.

The frame 24 also includes a fixed cover 32 coupled between the end pieces 28. The fixed cover 32 has a length that extends along the axis of rotation 30 of the drum 26. In the depicted embodiment, the fixed cover 32 has a width W that extends about a portion of the circumference of the drum 26 (see FIG. 3).

Referring to FIG. 3, the drum 26 carries a plurality of reducing elements 4 (e.g., teeth, cutters, knives, blades, bits, etc.) that are carried about the axis 30 as the drum 26 is rotated about the axis 30. As shown in FIG. 3, the drum 26 rotates in a direction indicated by arrow 36 during reducing operations. The drum 26 has an exposed cutting circumference C that generally faces forwardly and downwardly. In certain examples, the reducing elements 34 are configured to cut, break or otherwise reduce material such as tree limbs, branches, trees and brush. In certain examples, the reducing elements 34 can work in combination with an anvil 38 mounted to the frame 24 to facilitate reducing certain materials.

The reducing head 22 further includes a moveable thrown object deflector 38 (i.e., a moveable cover) positioned above the drum 26. The thrown object deflector 38 has a length that extends along the length of the drum 26. The thrown object deflector 38 is moveable relative to the frame 24, the fixed cover 32 and the drum 26. In certain examples, the defector 38 is movable generally in a circumferential or tangential direction relative to a cutting circle 39 defined by the outer tips of the reducing elements 34 of the drum 26 as the drum 26 is rotated about the axis 30. For example, the thrown object deflector 38 is shown being moveable between an extended position (see FIGS. 3 and 4) and a retracted position (see FIGS. 9 and 10). In certain examples, a sliding interface is provided between the thrown object deflector 38 and the frame 24 for allowing the thrown object deflector 38 to move between the extended and retracted. In the depicted example, the thrown object deflector 38 slides along grooves 40 (i.e., tracks, guides, etc.) defined by the frame 24. In the depicted example, the grooves 40 are linear and are defined by upper flanges 42 of the frame 24. The slide interface also includes slide units 44 attached to an upper side of the thrown object deflector 38. The slide units 44 include rollers 46 that fit within the grooves 40.

Figure 9:
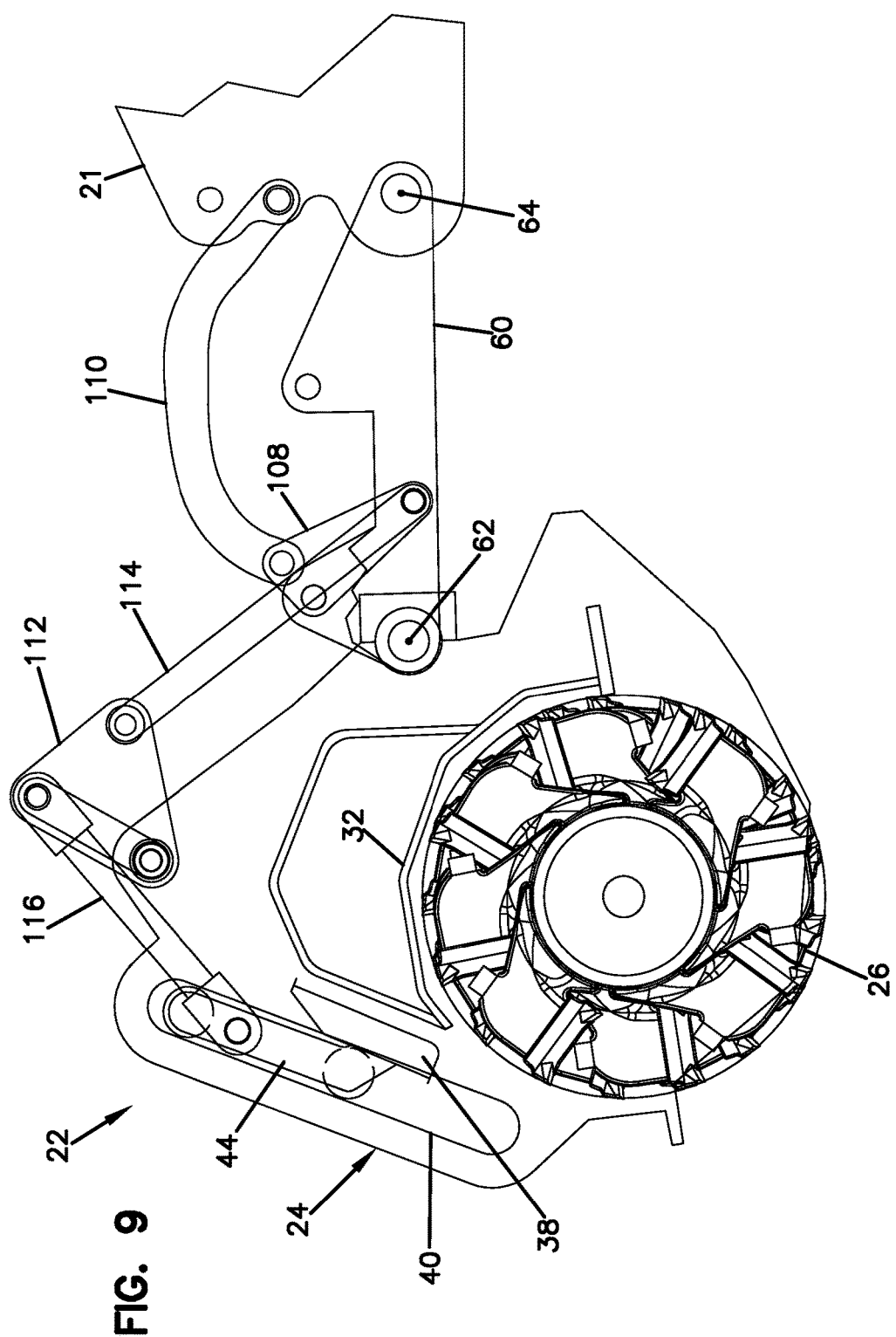
FIG. 9 shows the material reducing apparatus of FIGS. 1 and 2 in a lowered, tilted forward orientation with the hydraulic cylinders omitted and with the linkage arrangement depicted.

By moving the thrown object deflector 38 relative to the drum 26 and the fixed cover 32, it is possible to control a thrown object trajectory angle A of the material reducing apparatus 20. Additionally movement of the thrown object deflector 38 also modifies the circumferential coverage of the drum 26. When the thrown object deflector 38 is fully retracted as shown at FIG. 9, the exposed circumference C of the drum 26 is maximized. In contrast, when the thrown object deflector 38 is fully extended, the exposed circumference of the drum 26 is minimized. In certain examples, movement of the deflector can be coordinated with tilting and/or raising and lowering of the reducing head so as to maximize the available cutting circumference of the drum in a given orientation of the reducing head while always maintaining the thrown object trajectory angle A of the reducing head below a predetermined level. Thus, movement of the thrown object deflector provides a balance between drum exposure and the thrown object trajectory angle.

In certain examples, the material reducing apparatus can include a linkage arrangement for coupling the material reducing apparatus to the vehicle and for coordinating movement of the thrown object deflector with tilting and/or raising and lowering of the reducing head. In certain examples, the linkage arrangement can have a configuration that is symmetric about a vertical mid-plane that bisects the drum 26 and that is perpendicular relative to the axis of rotation 30 of the drum 26. For example, the linkage arrangement can include identical linkage sets positioned on opposite sides of the mid-plane. In certain examples, the material reducing apparatus can include an actuator arrangement that includes actuators (e.g., motors, hydraulic cylinders, pneumatic cylinders, etc.) for raising and lowering the reducing head and for tilting the reducing head forward and backward. In certain examples, the actuators can include hydraulic cylinders. In certain examples, the hydraulic cylinders can be arranged in a symmetric configuration about the mid-plane so as to include a first set of cylinders on one side of the mid-plane and a second set of cylinders on the opposite side of the mid-plane.

Referring to FIG. 3, an example linkage arrangement can include at least one arm 60 that couples the reducing head 22 to the vehicle 21. The arm 60 pivotally connects to the frame 24 of the reducing head 22 at a first pivot axis 62 (i.e., a tilt axis) and pivotally connects to the vehicle 21 at a second pivot axis 64. The arm 60 is elongated along a length that extends between a first end 66 and a second end 68. The first pivot axis 62 is positioned adjacent the first end 66 of the arm 60 and the second pivot axis 64 is positioned adjacent the second end 68 of the arm 60. The arm 60 further includes first and second ears 70, 72 positioned adjacent the first end 66 of the arm and a third ear 74 positioned adjacent the second end 68.

Figure 4:
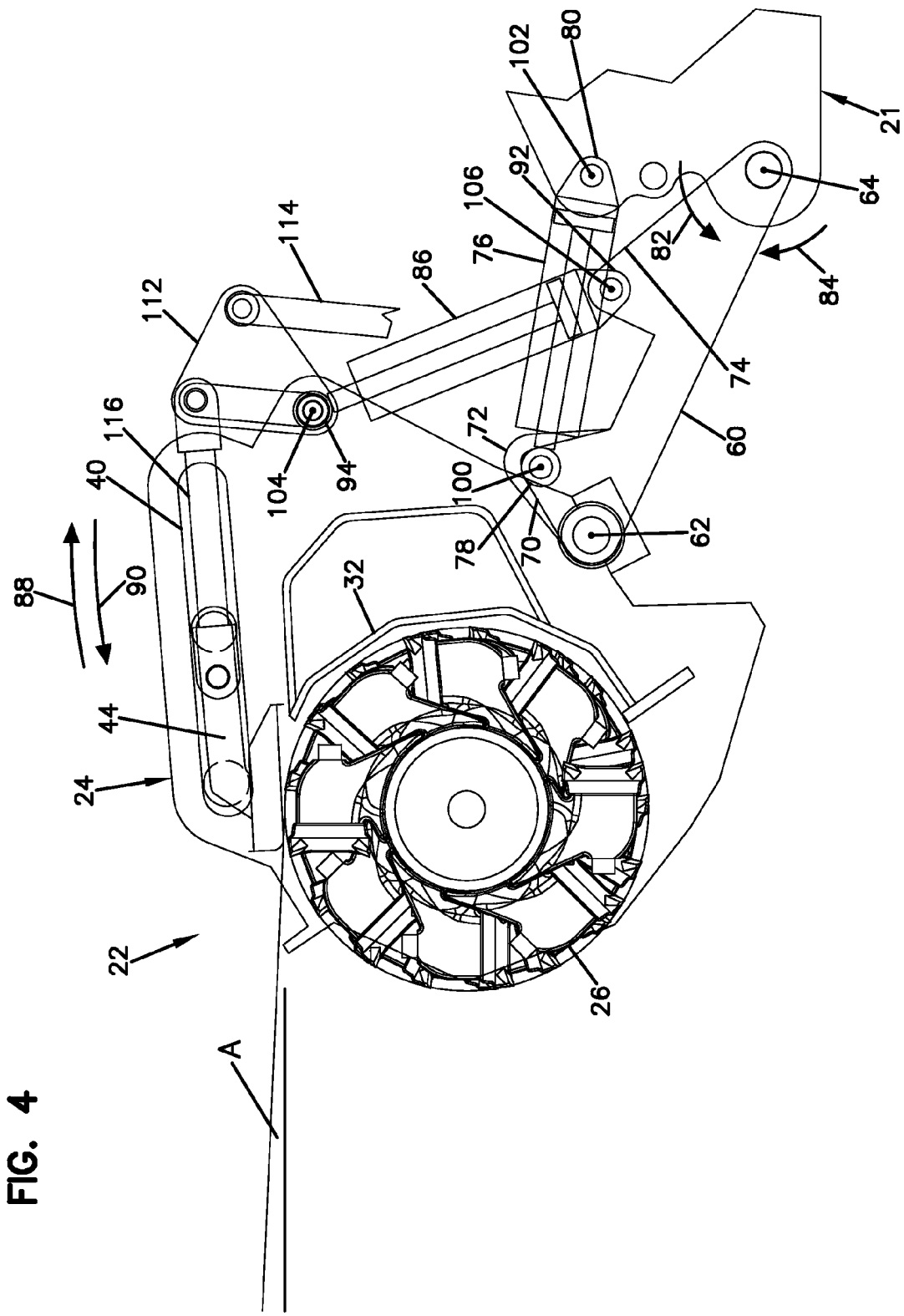
FIG. 4 illustrates the material reducing apparatus of FIGS. 1 and 2 in the raised, tilted back configuration with the hydraulic cylinders present and with portions of the linkage arrangement omitted.

As indicated above, the material reducing apparatus also include an actuator arrangement for providing powered lifting and tilting of the reducing head 22. For example, referring to FIG. 4, the actuator arrangement can include a first drive cylinder 76 (i.e., a lift cylinder) for raising and lowering the reducing head 22. In certain examples, the first drive cylinder 76 can include a hydraulic cylinder or a pneumatic cylinder. As depicted in FIG. 4, the first drive cylinder 76 has a first end 78 pivotally connected to the first ear 70 of the arm 60 and a second end 80 pivotally connected to the vehicle 21 at a location above the second pivot axis 64. Actuation of the first drive cylinder 76 causes the arm 62 pivot about the second pivot axis 64 thereby causing raising or lowering of the reducing head. When the arm 60 is pivoted in a first direction (see arrow 82) about the second pivot axis 64, the reducing head is lowered. In contrast, when the arm 60 is pivoted in a second direction (see arrow 84) about the second pivot axis 64, the reducing head is raised relative to the vehicle. In the depicted example, the first drive cylinder 76 is extended to pivot the arm 60 in the direction 82 thereby causing lowering of the reducing head relative to the vehicle 21 and is retracted to pivot the arm 60 in the direction 84 thereby causing raising of the pivot head relative to the vehicle 21. FIGS. 3-6 show the reducing head in a raised position relative to the vehicle 21 and FIGS. 7-11 show the reducing head in a lowered position relative to the vehicle.

Referring again to FIG. 4, the actuator arrangement further includes a second drive cylinder 86 for providing forward and backward tilt of the reducing head relative to the vehicle 21. In certain examples, the second drive cylinder 86 can include a hydraulic cylinder or a pneumatic cylinder. In certain examples, the second drive cylinder 86 can be referred to as a tilt cylinder or a tilt actuator. Actuation of the second drive cylinder 86 causes the reducing head to pivot about the first pivot axis 62. Arrow 88 represents a backward tilting direction of the reducing head about the first pivot axis 62 and arrow 90 represents a forward pivoting direction of the reducing head about the first pivot axis 62. The second drive cylinder 86 includes a first end 92 pivotally connected to the third ear 74 of the arm 60 and a second end 94 pivotally connected to the frame 24 of the reducing head 22. Extension of the second drive cylinder 86 causes the reducing head to pivot about the first pivot axis 62 in the forward direction 90. Refraction of the second drive cylinder 86 causes the reducing head to pivot in the backward direction 88 about the first pivot axis 62. FIGS. 3, 4, 7 and 8 show the reducing head in a backward tilt orientation and FIGS. 5, 6, 9 and 10 show the reducing head in a forward tilt orientation.

Figure 5:
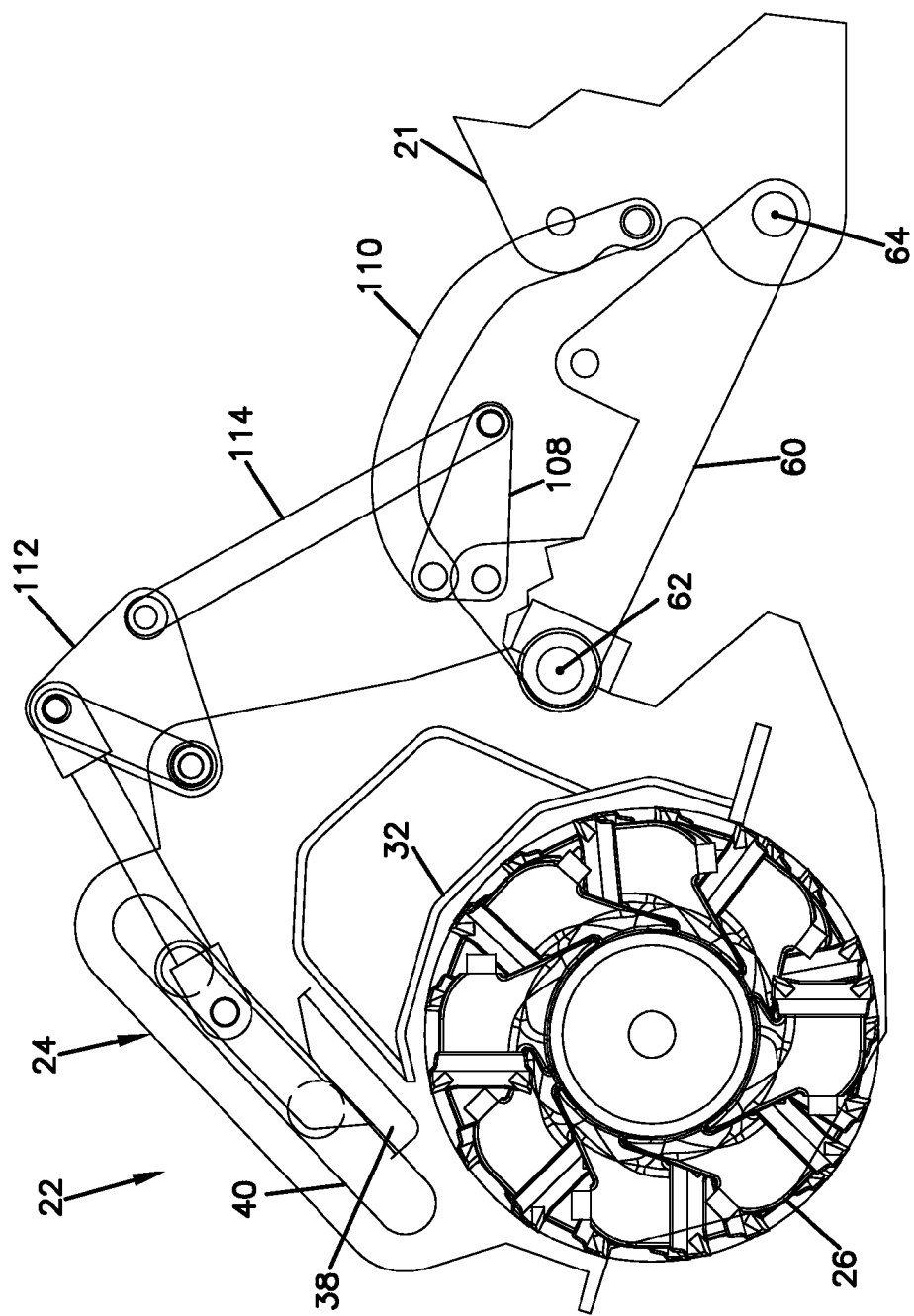
FIG. 5 shows the material reducing apparatus of FIGS. 1 and 2 in a raised, tilted forward orientation with the linkage arrangement depicted and with the hydraulic cylinders omitted.
Figure 6:
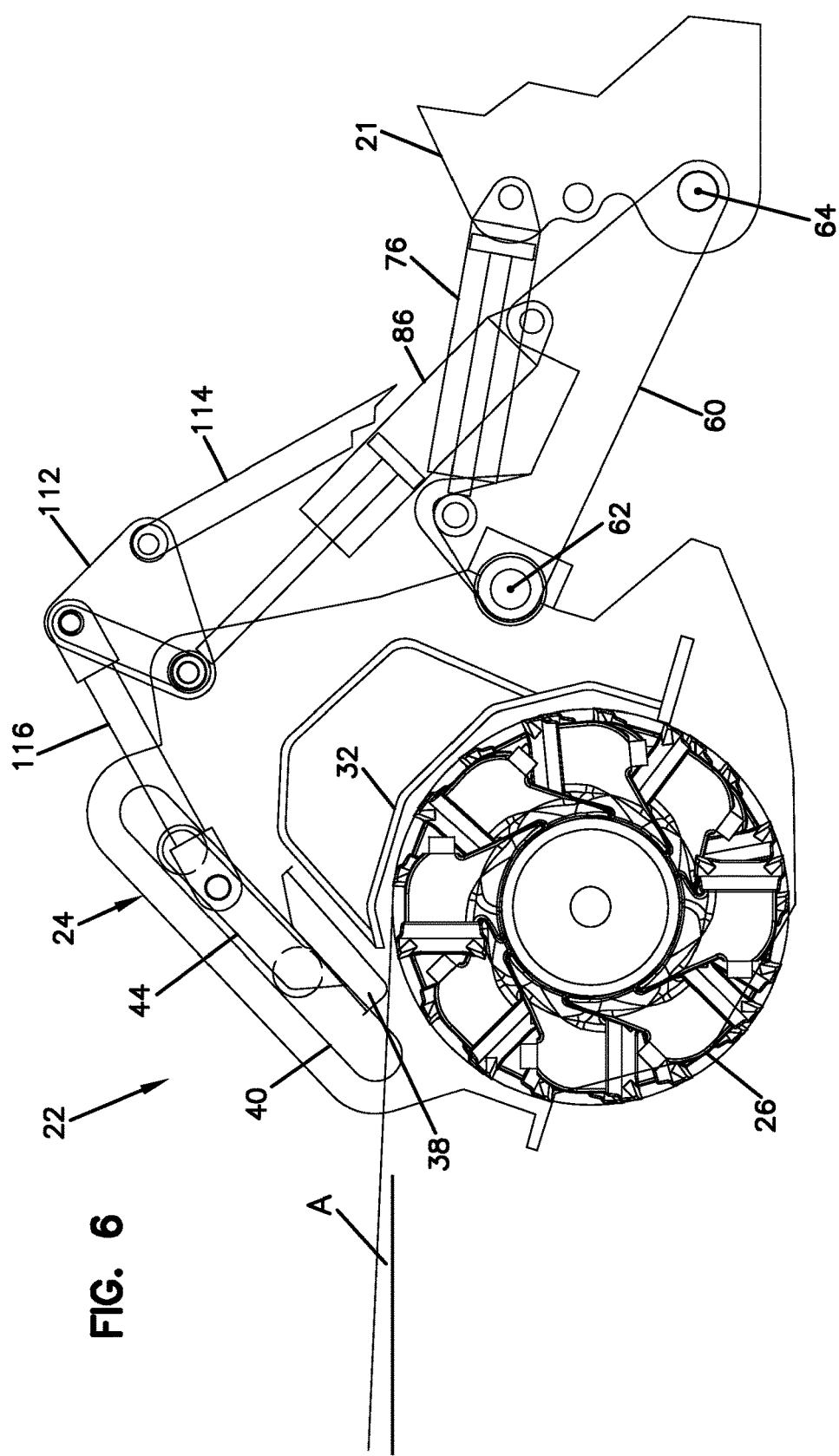
FIG. 6 shows the material reducing apparatus of FIGS. 1 and 2 in the raised, tilted forward orientation with the hydraulic cylinders depicted and with portions of the linkage arrangement omitted.
Figure 7:
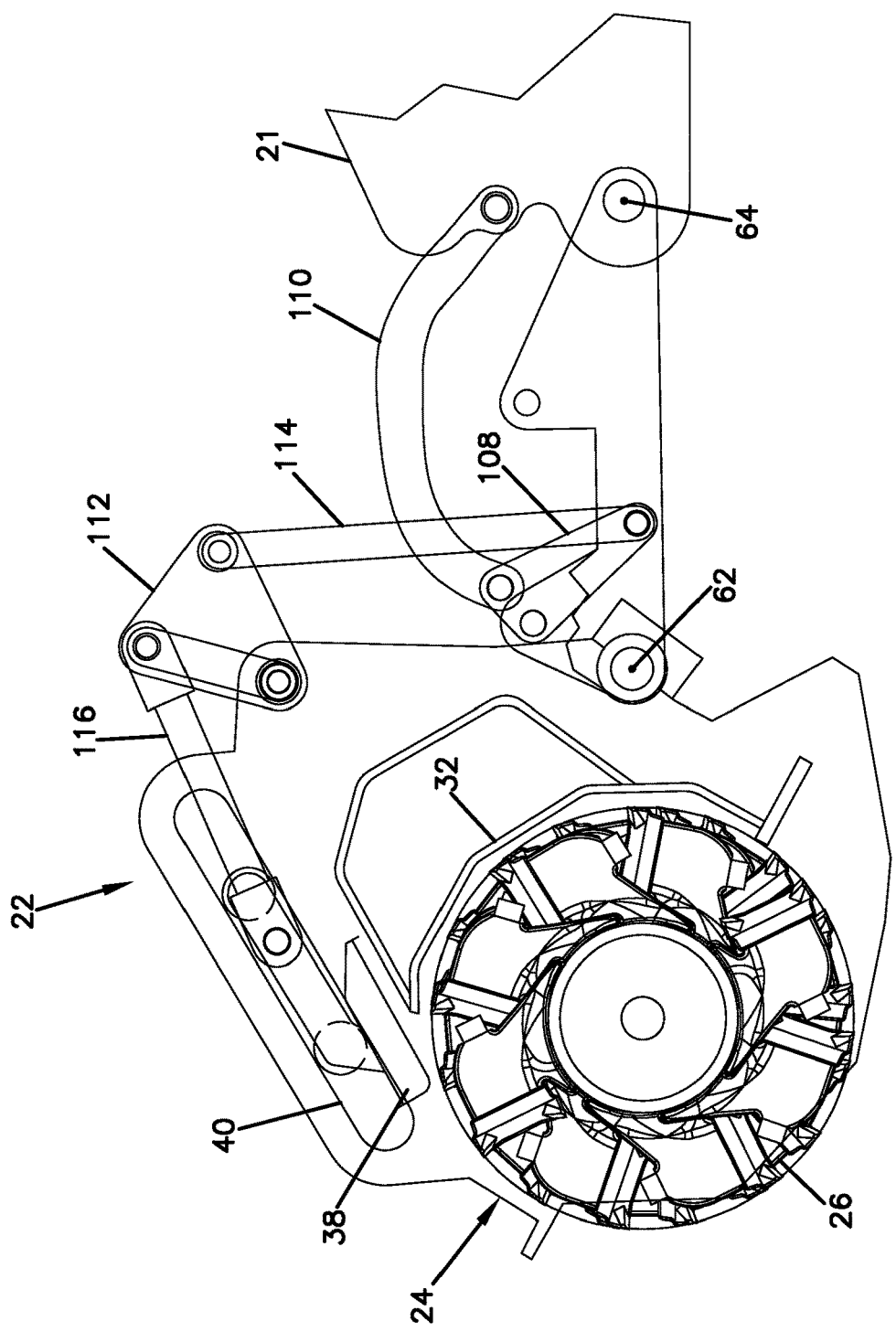
FIG. 7 shows the material reducing apparatus of FIGS. 1 and 2 in a lowered, tilted back orientation with the linkage arrangement depicted and with the hydraulic cylinders omitted.
Figure 8:
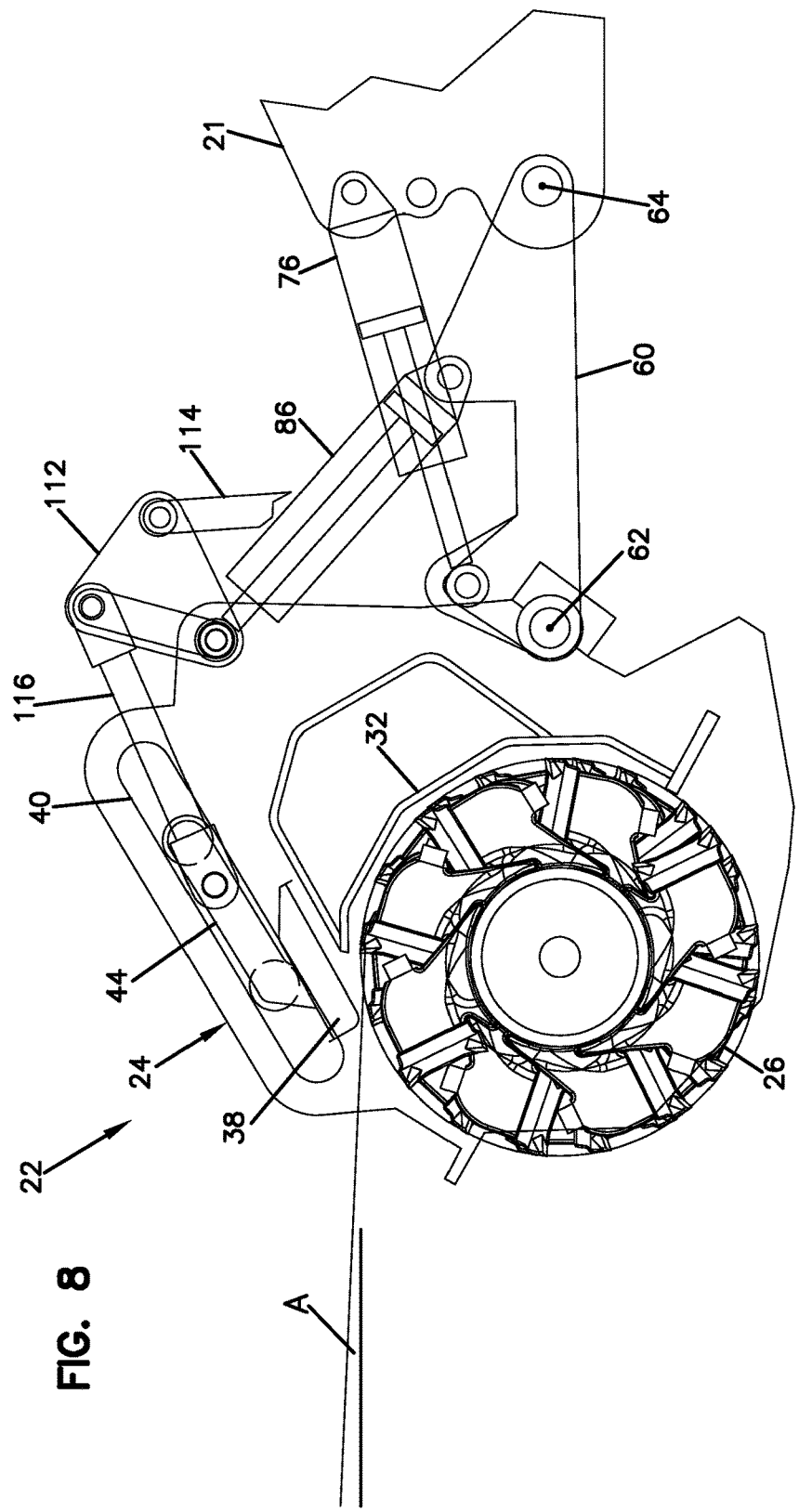
FIG. 8 shows the material reducing apparatus of FIGS. 1 and 2 in the lowered, tilted back orientation with the hydraulic cylinders depicted and with portions of the linkage arrangement omitted.
Figure 10:
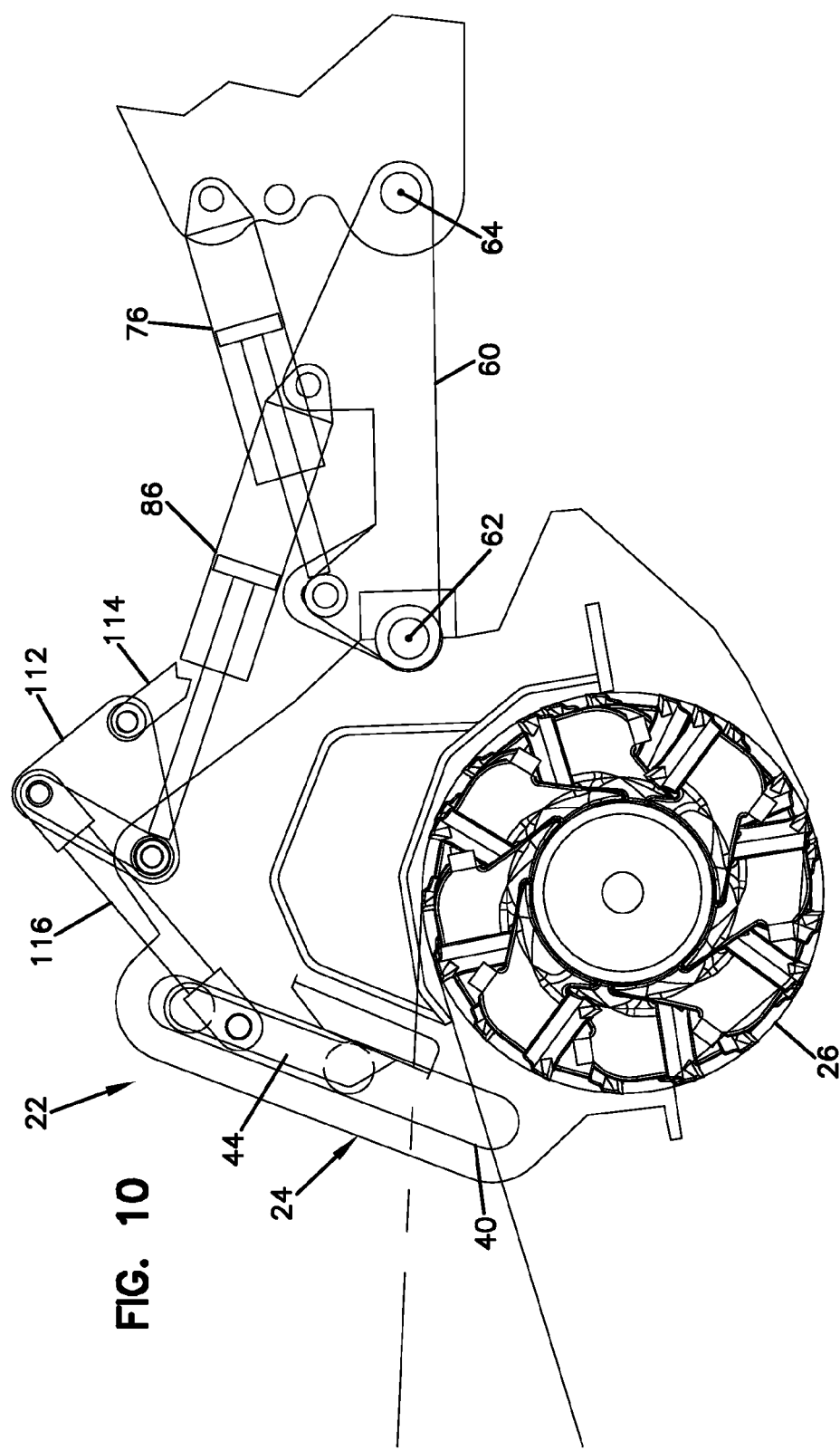
FIG. 10 shows the material reducing apparatus of FIGS. 1 and 2 in the lowered, tilted forward orientation with portions of the linkage arrangement omitted and with the hydraulic cylinders depicted.

It will be appreciated that the lift and tilt angle at a given orientation of the reducing head have an effect on the thrown object trajectory angle A of the reducing head. FIGS. 3-10 depict four basic orientations of the reducing head. For example, FIGS. 3 and 4 show the reducing head in a raised, tilted back orientation; FIGS. 5 and 6 show the reducing head in a raised, tilted forward orientation; FIGS. 7 and 8 show the reducing head in a lowered, tilted back orientation; and, FIGS. 9 and 10 show the reducing head in a lowered, tilted forward orientation. It will be appreciated that the raised, tilted back orientation of FIGS. 3 and 4 represents a worst-case scenario from the perspective of the thrown object projection angle. Therefore, it is preferred for the thrown object deflector to be fully extended when the reducing head is in the raised, tilted back orientation so as to limit the thrown object trajectory angle of the reducing head to a predetermined angle A. In certain examples, the predetermined angle A is less than or equal to six degrees above horizontal. The lowered, tilted forward orientation of FIGS. 9 and 10 represents a best-case scenario from the perspective of thrown object trajectory angle. When the reducing head is in the lowered, tilted forward orientation, the fixed cover 32 alone can provide suitable thrown object protection such that the thrown object trajectory angle of the reducing head is less than the predetermined trajectory angle A (e.g., less than six degrees). Thus, when the reducing head is in the lowered, tilted forward orientation, the deflector plate can be fully retracted relative to the fixed cover 32 so as to maximize the exposed circumference C of the reducing drum 26. In this way, the reducing efficiency of the reducing drum 26 can be enhanced by increased drum exposure while the thrown object trajectory of the reducing head remains at an acceptable level.

In certain examples, the first pivot axis 62, the second pivot axis 64 and the axis of rotation of the drum are all parallel. In certain examples, all of the pivot axes of the various linkages of the linkage arrangement and the actuators of the actuator arrangement are parallel to the axis of rotation of the drum 26. In certain examples, the linkage arrangement can include a movement coordinating linkage suitable for coordinating movement of the thrown object deflector 38 relative to the frame 24 and the drum 26 as the orientation of the reducing head 22 is modified (e.g., as the reducing head 22 is tilted or as the reducing head is raised or lowered or both).

The first drive cylinder 76 is pivotally connected to the first ear 70 of the arm 60 at pivot location 100, the second end 80 of the first drive cylinder 76 is pivotally connected to the vehicle 21 at pivot location 102, the first end 92 of the second drive cylinder 86 is pivotally connected to the frame 24 of the reducing head 22 at pivot location 104 and the second end 94 of the second drive cylinder 86 is pivotally connected to the third ear 74 of the arm 60 at pivot location 106.

Referring to FIG. 3, the movement coordinating linkage can include a linkage plate 108 (e.g., a cam plate), a curved link 110, a linkage plate 112, a link 114, and a link 116. The linkage plate 108 is depicted as a generally triangular plate having rounded corners. Pivot locations 118, 120 and 122 are provided adjacent to each of the corners. The linkage plate 108 is pivotally connected to the second ear 72 of the arm 60 at the pivot location 118. The curved link 110 includes opposite ends 124, 126. End 124 is pivotally connected to the linkage plate 108 at pivot location 120. End 126 is pivotally connected to the vehicle 21 at pivot location 130. Pivot location 130 is located between location 102 and the second pivot axis 64. The link 114 is depicted as a straight, bar or rod style link having opposite ends 132, 134. The linkage plate 112 is depicted as a generally triangular plate having rounded corners. Pivot locations 136, 138 and 140 are positioned adjacent to each of the rounded corners of the linkage plate 112. The linkage plate 112 is pivotally connected to the frame 24 at pivot location 136. Pivot location 136 is coextensive with pivot location 104 of the second drive cylinder 86. The end 132 of link 114 is pivotally connected to linkage plate 108 at pivot location 122 and the end 134 of link 114 as pivotally connected to linkage plate 112 at pivot location 138. Link 116 is depicted as a straight, rod or bar style link having opposite ends 142, 144. The end 142 is pivotally connected to linkage plate 112 at pivot location 140 and the end 144 is pivotally connected to one of the slide units 44 at pivot axis 146.

It will be appreciated that the movement coordinating linkage automatically moves the thrown object deflector 38 relative to the frame 24, the drum 26 and the fixed cover 32 as the second drive cylinder 86 pivots the reducing head 22 about the first pivot axis 62 between the tilted back orientation and the tilted forward orientation. FIGS. 3 and 4 show the reducing head 22 in the raised, tilted back orientation and FIGS. 5 and 6 show the reducing head 22 in the raised, tilted forward orientation. A comparison of these Figures shows that the movement coordinating linkage automatically retracts the thrown object deflector 38 relative to the fixed cover 32 as the reducing head 22 is pivoted from the tilted back orientation toward the tilted forward orientation. Conversely, the movement coordinating linkages automatically extends the thrown object deflector 38 relative to the fixed cover 32 as the reducing head 22 is moved from the tilted forward orientation toward the tilted back orientation. FIGS. 7-10 illustrate reducing head 22 in the lowered configuration. FIGS. 7 and 8 show the reducing head 22 in the lowered, tilted back orientation, and FIGS. 9 and 10 show the reducing head 22 and the lowered, tilted forward orientation. With the reducing head 22 in the lowered position, the movement coordinating linkage continues to automatically control the position of the thrown object deflector 38 relative to the fixed cover 32 as the reducing head 22 is tilted about the first pivot axis 62. For example, the thrown object deflector 38 is retracted relative to the fixed cover 32 as the reducing head 22 is tilted from the tilted back orientation of FIGS. 7 and 8 toward the tilted forward orientation of 9 and 10. Conversely, the thrown object deflector 38 is automatically extended relative to the fixed cover 32 by the movement coordinating linkage as the reducing head 22 is tilted from the tilted forward orientation of FIGS. 9 and 10 toward the tilted back orientation of FIGS. 7 and 8.

The movement coordinating linkage also automatically controls the position of the moveable thrown object deflector 32 as the reducing head 22 is moved by the first drive cylinder 76 between the raised position (see FIGS. 3-6) and the lowered position (see FIGS. 7-10). FIGS. 5 and 6 show the reducing head 22 in the raised, tilted forward orientation and FIGS. 9 and 10 show the reducing head 22 in the lowered, tilted forward orientation. A comparison of these Figures shows that the movement coordinating linkage automatically retracts the thrown object deflector 38 relative to the fixed cover 32 as the reducing head 22 is moved from the raised position of FIGS. 5 and 6 toward the position of FIGS. 9 and 10. Conversely, the movement coordinating linkage automatically extends the thrown object deflector 38 relative to the fixed cover 32 as the reducing head is moved from the lowered position of FIGS. 9 and 10 toward the raised position of FIGS. 5 and 6. Similar control of the position of the thrown object deflector 338 occurs when the reducing head 22 is raised and lowered while the reducing head is in the tilted back orientation (see a comparison of FIGS. 3 and 4 to FIGS. 7 and 8).

Figure 11:
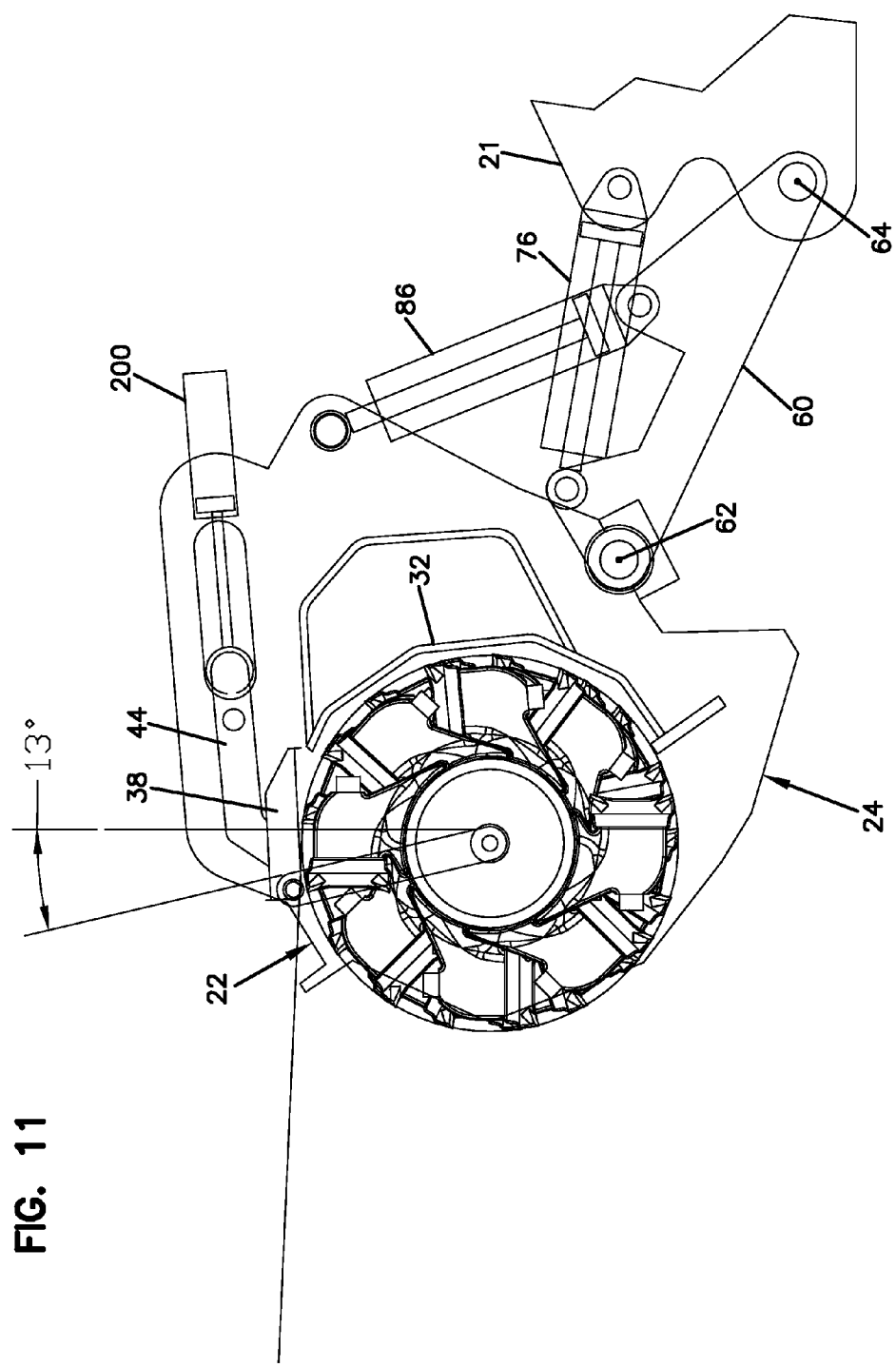
FIG. 11 shows an alternative material reducing apparatus in accordance with the principles of the present disclosure depicted in a raised, tilted back orientation.
Figure 12:
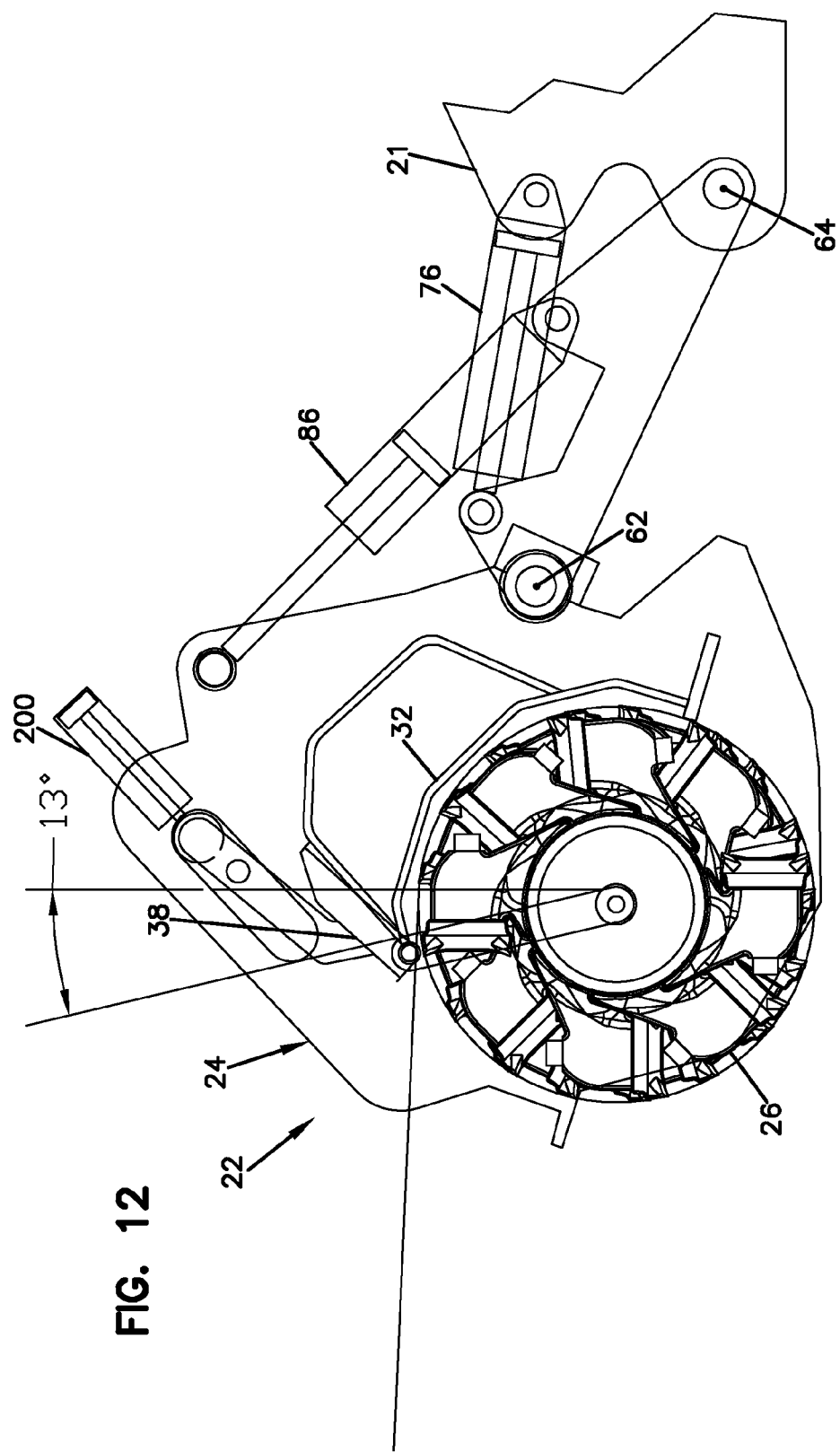
FIG. 12 shows the material reducing apparatus of FIG. 11 and a raised, tilted forward orientation.
Figure 13:
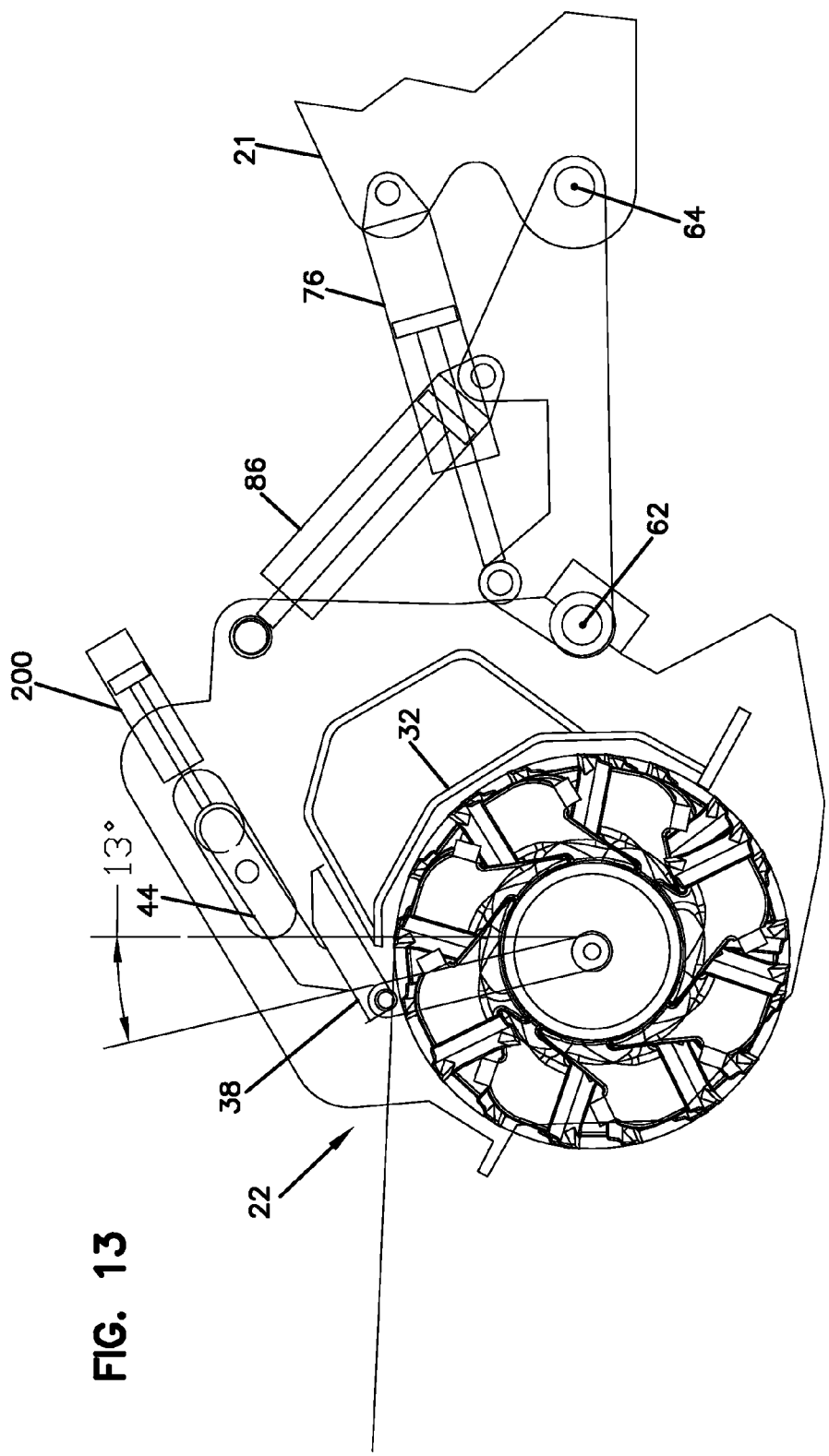
FIG. 13 shows the material reducing apparatus of FIG. 11 in a lowered, tilted back orientation.
Figure 14:
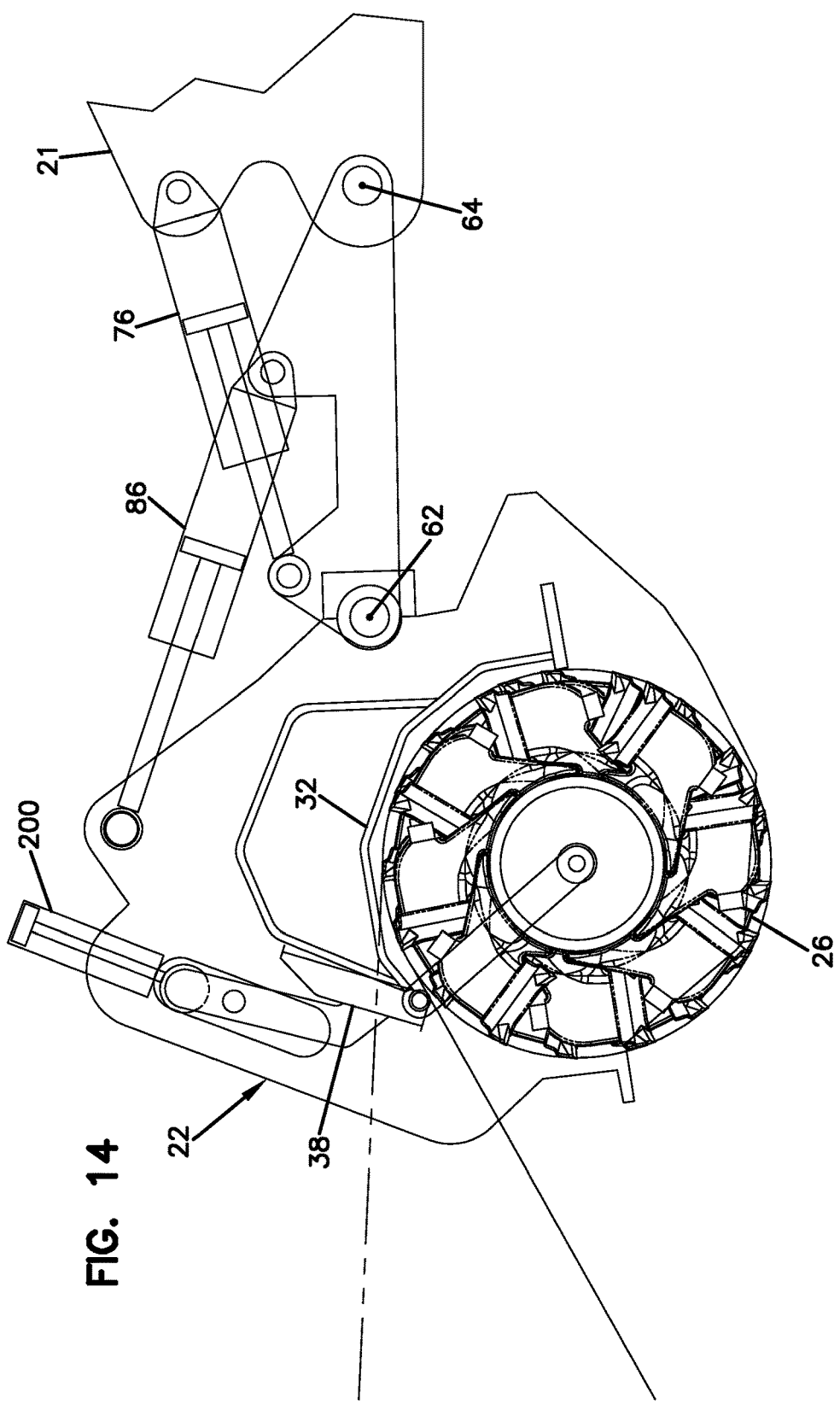
FIG. 14 shows the material reducing apparatus of FIG. 11 in a lowered, tilted forward orientation.
Figure 15:
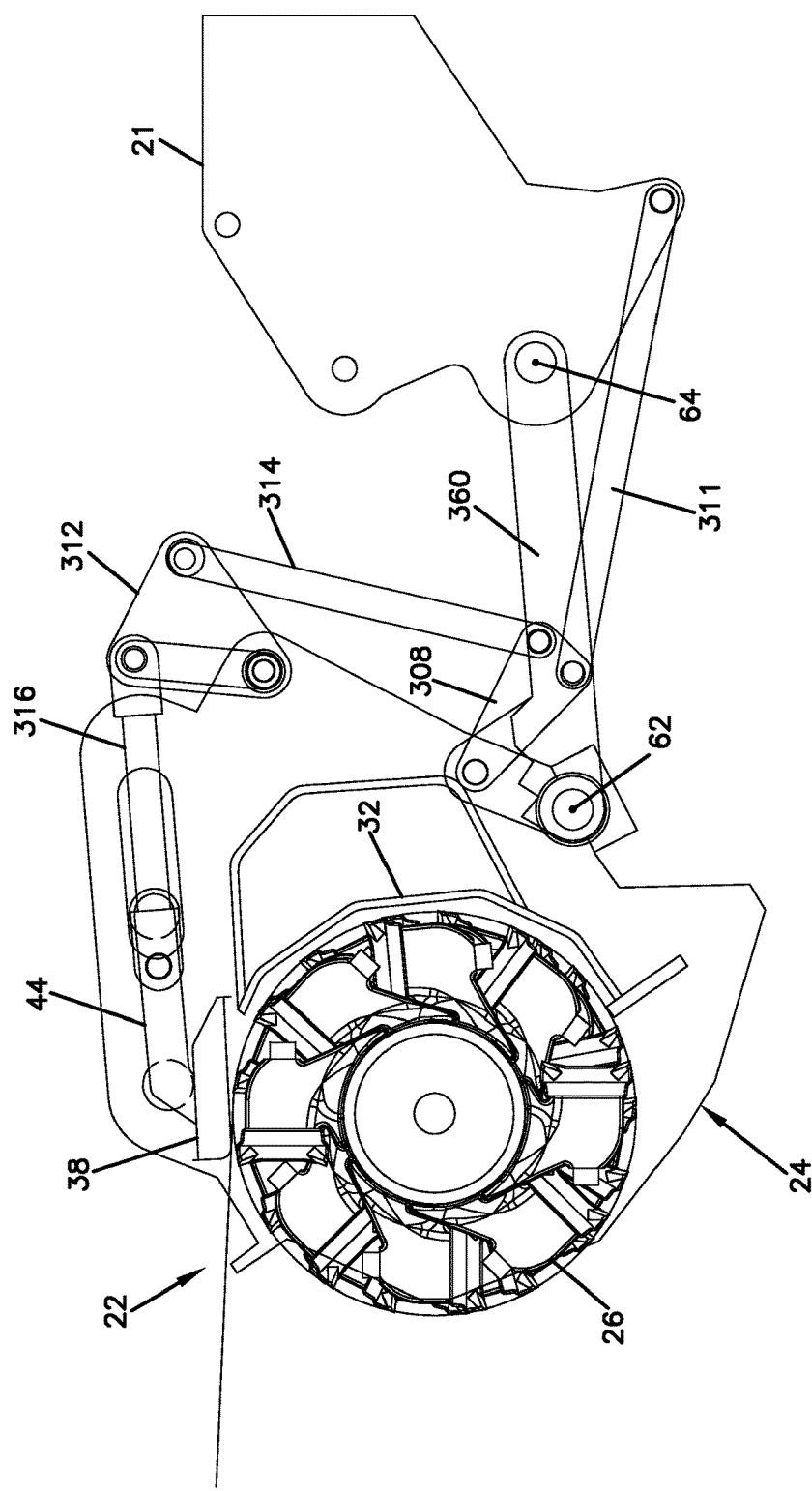
FIG. 15 shows a further material reducing apparatus in accordance with the principles of the present disclosure in a lowered, tilted back orientation, a movement coordinating linkage is depicted while hydraulic cylinders have been omitted for clarity.
Figure 16:
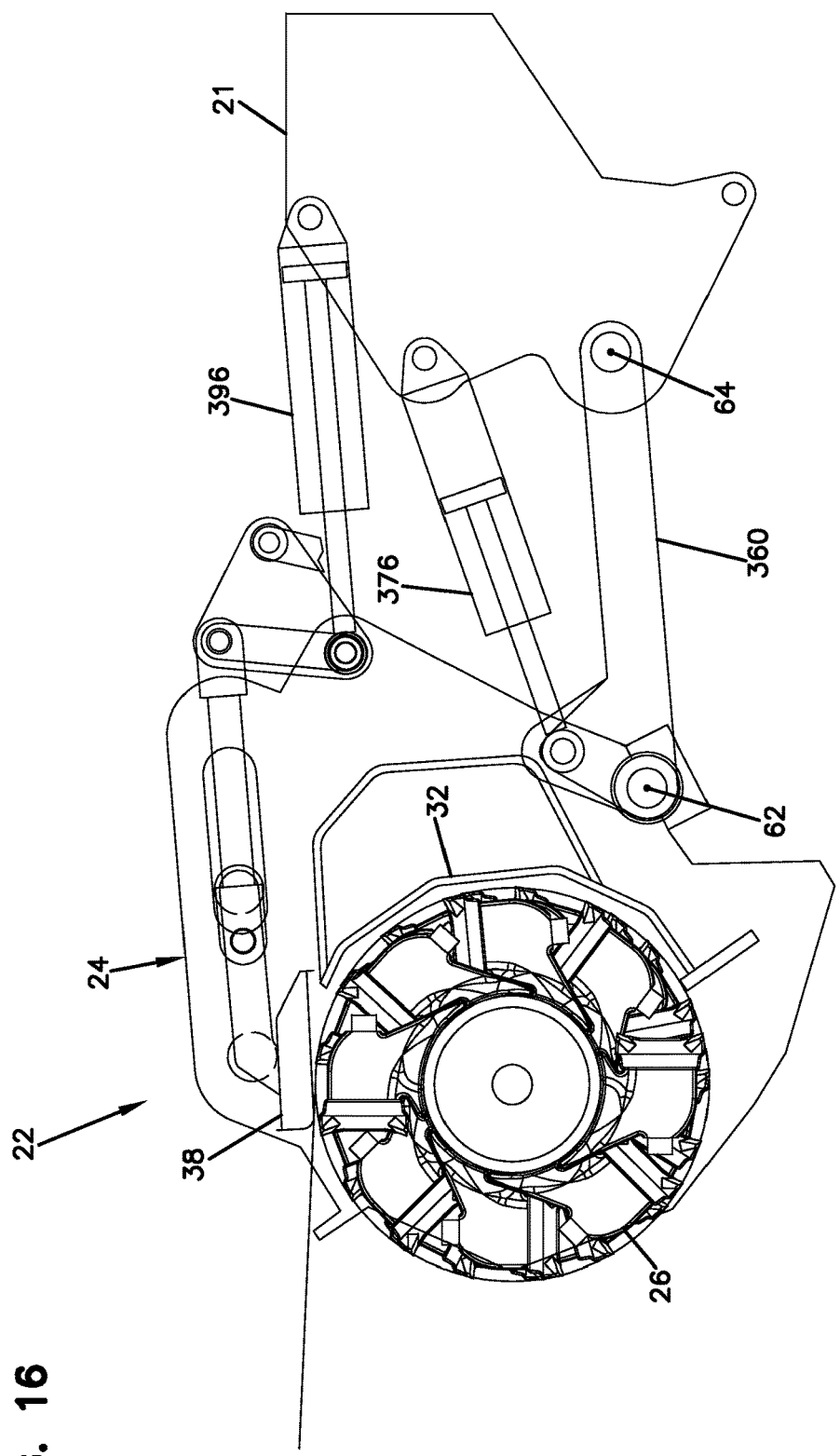
FIG. 16 shows the material reducing apparatus of FIG. 15 in the lowered, tilted back configuration with the hydraulic cylinders depicted and portions of the movement coordinating linkage omitted.
Figure 17:
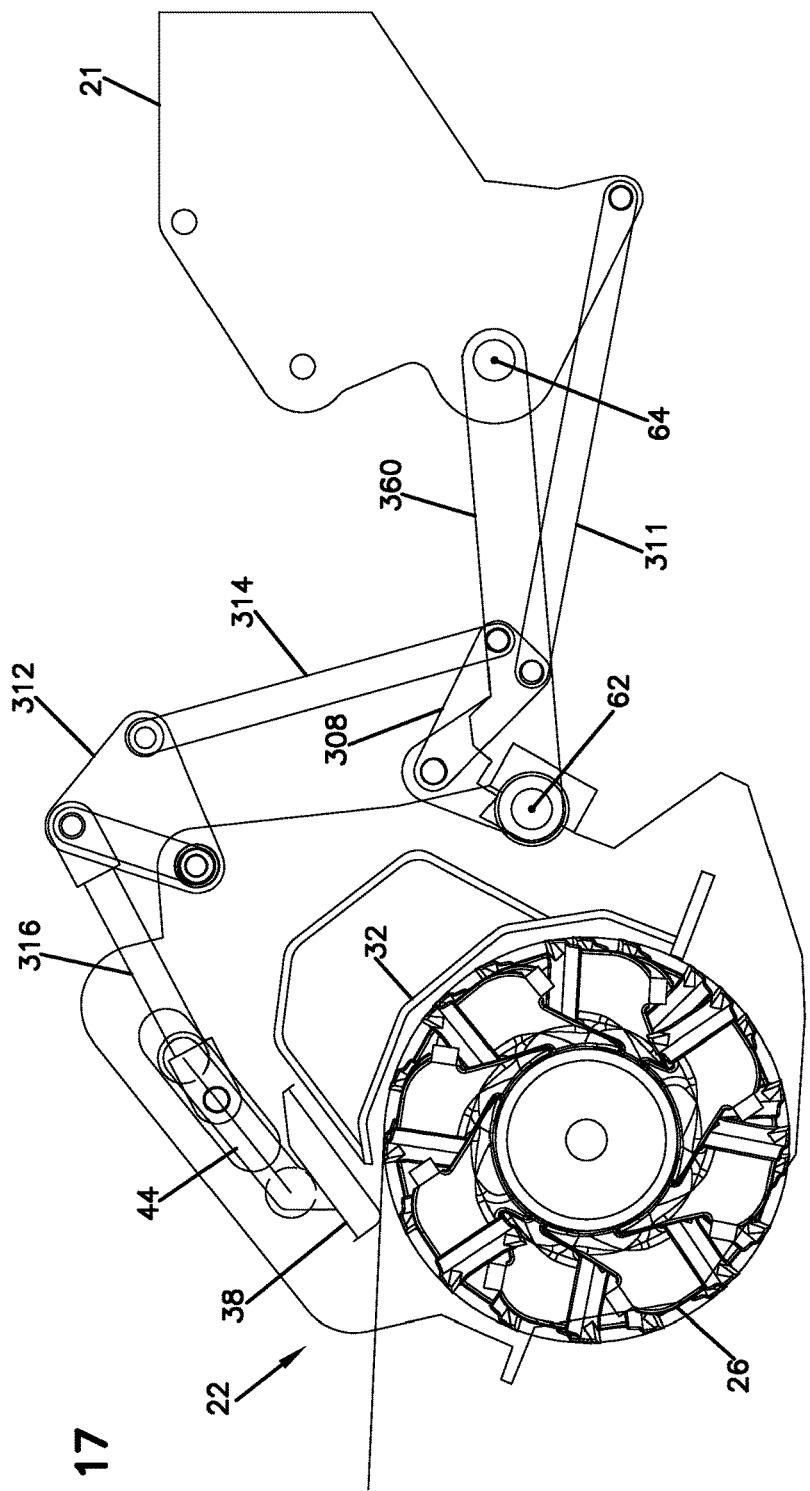
FIG. 17 shows the material reducing apparatus of FIGS. 15 and 16 in a lowered, tilted forward orientation with the movement coordinating linkage depicted and with the hydraulic cylinders omitted.
Figure 18:
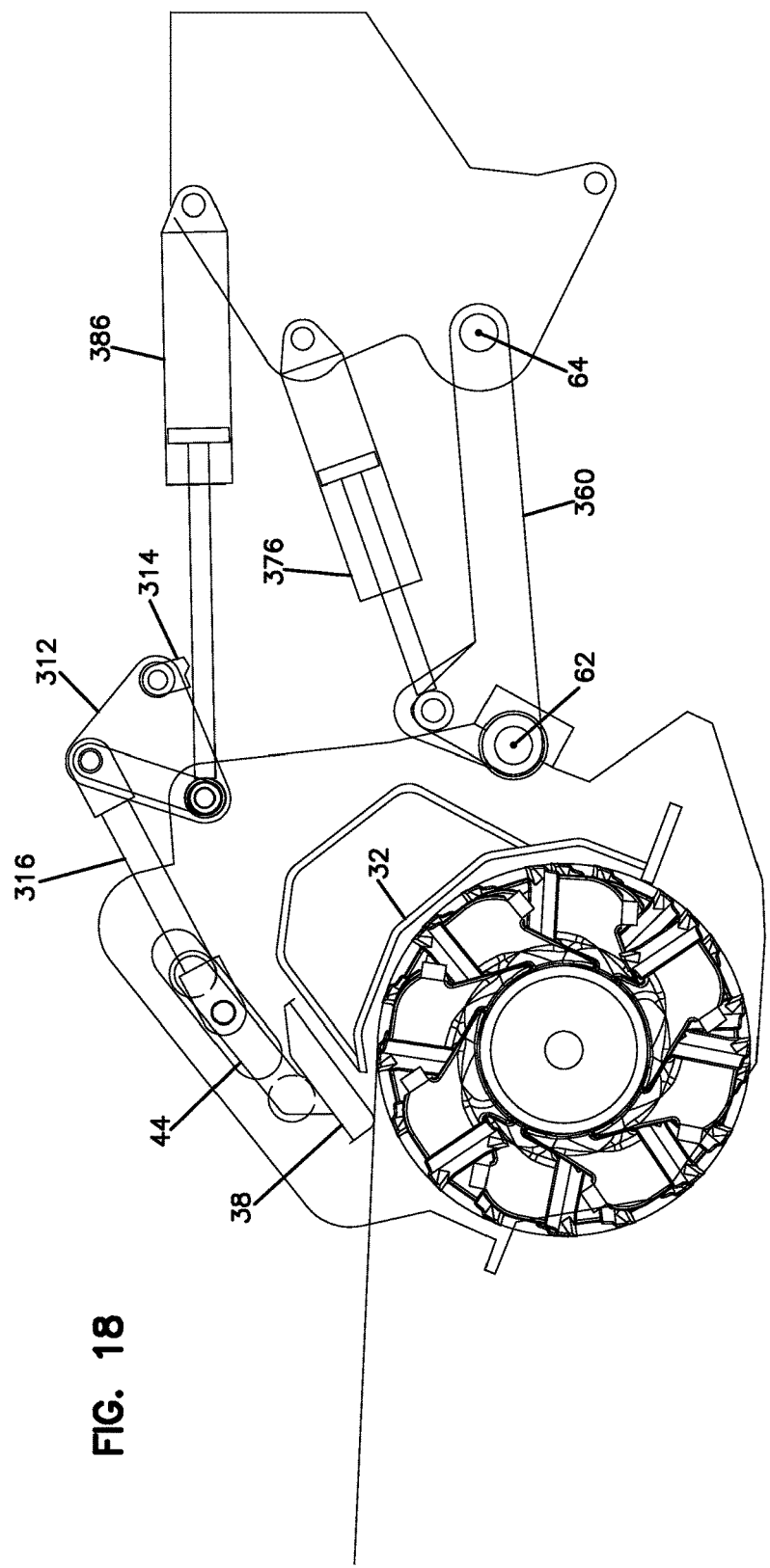
FIG. 18 shows the material reducing apparatus of FIG. 17 in the lowered tilted forward orientation with the hydraulic cylinders depicted and with portions of the movement coordinating linkage omitted.
Figure 19:
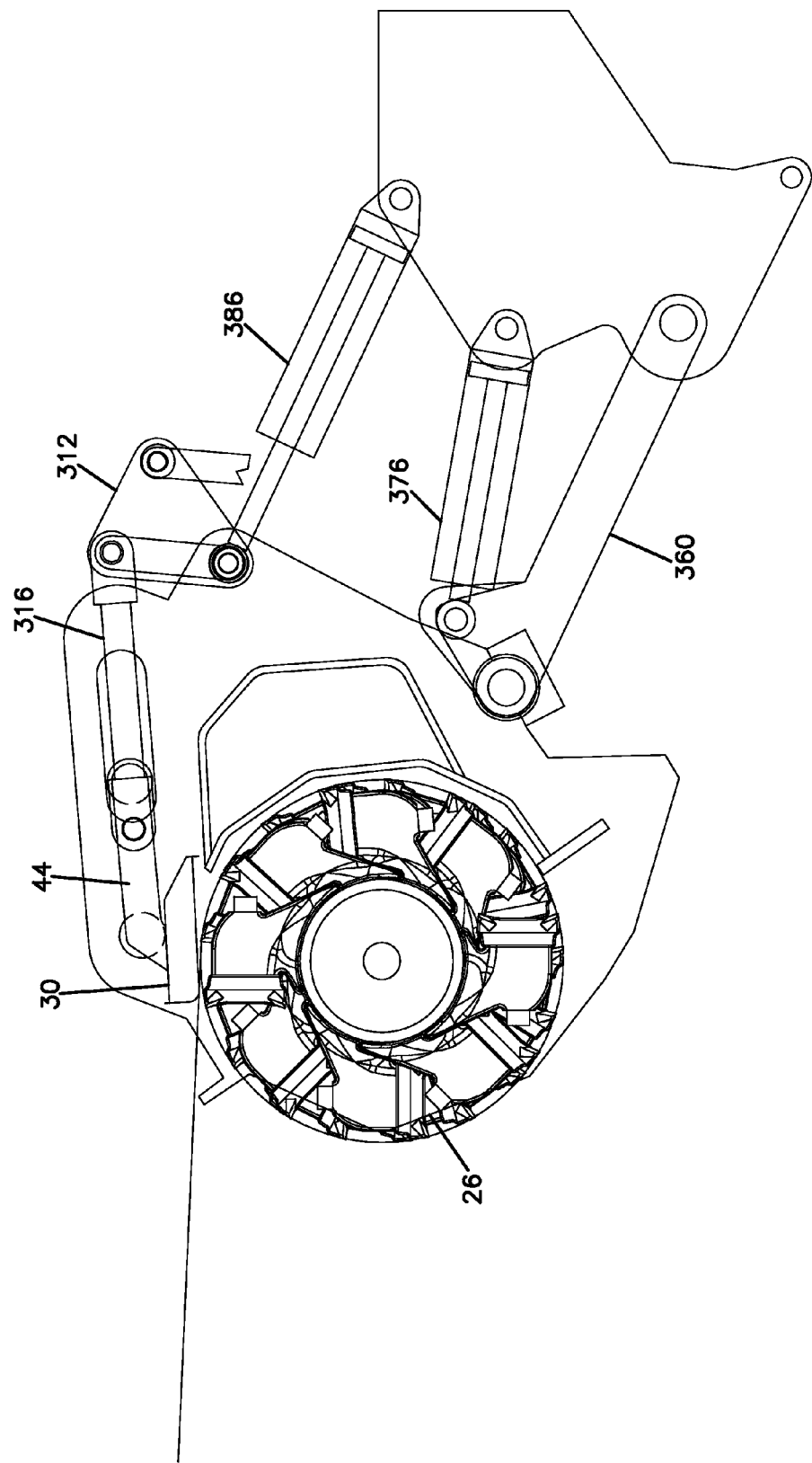
FIG. 19 shows the material reducing apparatus of FIGS. 15-18 in a raised, tilted back orientation with the hydraulic cylinders depicted and with portions of the movement coordinating linkage omitted.

FIGS. 11-14 illustrate another movement coordinating arrangement useable for use with the reducing head 22. Rather than being a pure mechanical system, the arrangement of FIGS. 11-14 utilize the sensors and electronic control to coordinate the position of the thrown object deflector 38 relative to the fixed cover 32 as the reducing head 22 is tilted; as the reducing head 22 is raised or lowered; or both. In the example of FIGS. 11-14, an actuator 200 is used to control the position of the thrown object deflector 38 relative to the fixed cover 32. In one example, the actuator 200 can include a hydraulic cylinder, a pneumatic cylinder, a motor (e.g., electric, pneumatic or hydraulic) or other structure. In certain examples, the actuator 200 is configured to move the thrown object deflector 38 along the grooves 40 to adjust the position of the thrown object deflector 38 relative to the fixed cover 32. In certain examples, the system can include an electronic controller that interfaces with one or more sensors that provide data for determining the appropriate position of the thrown object deflector 38 relative to the fixed cover 32. In certain examples, the sensors can include rotation sensors or (e.g., rotary encoders) used to determine the rotational position of the reducing head 22 about the first pivot axis 62 and also used to determine the rotational position of the arm 60 about the second pivot axis 64. In other examples, linear positions sensors corresponding to the first and second drive cylinders 76, 86 can be used to determine the degree of extension of the drive cylinders 76, 86, which in turn can be used to calculate the tilt orientation and elevation of the reducing head 22. In still other examples, a sensor such as an inclinometer can be mounted on the reducing head 22 and used to determine the tilt of the reducing head 22, which in turn can be used to determine the appropriate position of the thrown object deflector 38. As shown at FIG. 11, the actuator 200 is a hydraulic cylinder having a body coupled to the frame 24 and a rod coupled to the slide unit 44. By extending the actuator 200, the thrown object deflector 38 is moved toward the extended orientation (see FIG. 11). By retracting the actuator 200, the thrown object deflector 38 is moved toward the retracted orientation (see FIG. 14). Similar to the embodiment of FIGS. 3-10, the first drive cylinder 76 is used to move the reducing head of FIGS. 11-14 between a raised position (see FIGS. 11 and 12) and a lowered position (see FIGS. 13 and 14). Additionally, the second drive cylinder 86 is used to pivot the reducing head 22 about the first pivot axis 62 between the tilted back orientation (see FIGS. 11 and 13) and the tilted forward orientation (see FIGS. 12 and 14). The sensors continuously monitor the degree of tilt as well as the degree of raising and lowering and convey such information to the electronic controller which provides a corresponding actuation signal to the actuator 200 so as to position the thrown objet deflector 38 at a desired position relative to the fixed cover 32 thereby maintaining the thrown object trajectory of the reducing head below a predetermined level while also enlarging the exposed circumference of the drum 26 in certain positions.

FIGS. 15-19 illustrate another linkage arrangement in accordance with the principles of the present disclosure. The linkage arrangement includes a modified movement coordinating linkage arrangement for coordinating movement of the thrown object deflector 38 relative to the fixed cover 32. Similar to the previously described embodiments, the example of FIGS. 15-19 includes an arm 360 pivotally connected to the frame 24 of the reducing head 22 at the first pivot axis 62 and pivotally connected to the vehicle 21 at the second pivot axis 64. A first drive cylinder 376 is pivotally connected to a first ear 370 of the arm 360 and is also pivotally connected to the vehicle 21. By extending the first drive cylinder 376, the arm 360 is pivoted about the second pivot axis 64 causing the reducing head 22 to be lowered. By retracting the first drive cylinder 376, the arm 360 is pivoted about the second pivot axis 64 causing the reducing head 22 to be raised. A second drive cylinder 386 has a first end pivotally connected to the frame 24 and a second end pivotally connected to the vehicle 21. By extending the second drive cylinder 386, the reducing head 22 is tilted forwardly about the first pivot axis 62. By retracting the second drive cylinder 386, the reducing head 22 is tilted backwardly about the first pivot axis 62. The movement coordinating linkages includes linkage plate 308, linkage plate 312, link 311, link 314 and link 316. The linkage plate 308 is pivotally connected to a second ear of the arm 360, to one end of the link 314 and to one end of the link 311. The other end of the link 311 is pivotally connected to the vehicle 21 and the other end of the link 314 is pivotally connected to the linkage plate 312. The linkage plate 312 is also pivotally connected to the frame 24 and to one end of the link 316. The other end of the link 316 is connected to the slide unit 44.

Similar to the previously described embodiments, when the reducing head 22 is tilted about the first pivot axis 62 from the tilted back orientation toward the tilted forward orientation, the movement coordinating linkages automatically cause the thrown object deflector 38 to retract relative to the fixed cover 32. Conversely, when the reducing head 22 is pivoted from the tilted forward orientation toward the tilted back orientation, the movement coordinating linkage automatically causes the thrown object deflector 38 to extend relative to the fixed cover 32. In the example of FIGS. 15-19, the movement coordinating linkages provide coordinated movement of the thrown object deflector 38 relative to the fixed cover 32 in response to tilting of the reducing head 22 about the first pivot axis 62, but does not provide meaningful movement of the thrown object deflector 38 in response to raising and lowering of the reducing head 22 through pivotal movement of the arm 360.

In certain examples, the fixed cover 32 has an inner surface that extends along the width W and generally follows or conforms to the cutting circumference of the drum 28. The inner surface can be defined by a plate including a plurality of flats connected by bends. The number of bends can be varied (e.g., 2, 3, 5 or more bends) to change the performance of the machine. A lower number of angles results in the flat surfaces being angled at steeper angles relative to the circumference causing more aggressive contact between the material being reduced and the surfaces. A lower number of angles also provides larger pockets surrounding the circumference and steeper plate angles for enhanced material impingement which can affect the degree to which material tends to be discharged from the machine.

What is claimed is:

1. A material reducing apparatus comprising:
   a reducing head including a rotatable reducing component that carries a plurality of cutters, the reducing head also including a thrown object deflector and a cover portion, the cover portion extending along a length of the rotatable reducing component and covering a portion of a circumference of the rotatable reducing component, and the thrown object deflector extending along the length of the rotatable reducing component and being movable relative to the cover portion and also movable relative to the rotatable reducing component;

an arm for coupling the reducing head to a vehicle, the arm being coupled to the reducing head at a first pivot axis for allowing the reducing head to be pivoted relative to the arm between a forward tilt orientation and a backward tilt orientation, the arm also being pivotally movable about a second pivot axis for allowing the reducing head to be moved relative to the vehicle between a raised position and a lowered position; and a position control arrangement that interfaces with the thrown object deflector and automatically moves the thrown object deflector relative to the cover portion at least when the reducing head is pivoted about the first axis to automatically control a thrown object trajectory angle of the reducing head.

2. The material reducing apparatus of claim 1, wherein the rotatable reducing component includes a drum that rotates about an axis of rotation, and wherein the first and second pivot axes are parallel to the axis of rotation.

3. The material reducing apparatus of claim 1, wherein the position control arrangement automatically retracts the thrown object deflector relative to the cover portion when the reducing head is pivoted from the backward tilted orientation toward the forward tilted orientation, and wherein the position control arrangement automatically extends the thrown object deflector relative to the cover portion when the reducing head is pivoted from the forward tilted orientation toward the backward tilted orientation.

4. The material reducing apparatus of claim 3, wherein the position control arrangement automatically retracts the thrown object deflector relative to the cover portion when the arm is pivoted from the raised position toward the lowered position, and wherein the position control arrangement automatically extends the thrown object deflector relative to the cover portion when the arm is pivoted from the lowered position toward the raised position.

5. The material reducing apparatus of claim 4, wherein the thrown object deflector is fully retracted relative to the cover portion when the arm is in the lowered position and the reducing head is in the forward tilted orientation.

6. The material reducing apparatus of claim 5, wherein the cover portion controls the thrown object trajectory angle when the arm is in the lowered position and the reducing head is in the forward tilted orientation, wherein the thrown object deflector controls the thrown object trajectory angle when the arm is in the lowered position and the reducing head is in the backward tilted orientation, wherein the thrown object deflector controls the thrown object trajectory angle when the arm is in the raised position and the reducing head is in the forward tilted orientation, and wherein the thrown object deflector controls the thrown object trajectory angle when the arm is in the raised position and the reducing head is in the backward tilted orientation.

7. The material reducing apparatus of claim 5, wherein the thrown object deflector is fully extended relative to the cover portion when the arm is in the raised position and the reducing head is in the backward tilted orientation.

8. A material reducing apparatus comprising:

a reducing head including a rotatable reducing component that carries a plurality of cutters, the reducing head also including a thrown object deflector and a cover portion, the cover portion covering a portion of a circumference of the rotatable reducing component, and the thrown object deflector being movable relative to the cover portion and also movable relative to the rotatable reducing component;

an arm for coupling the reducing head to a vehicle, the arm being coupled to the reducing head at a first axis for allowing the reducing head to be moved relative to the arm between a forward tilt orientation and a backward tilt orientation, the arm also being movable about a second axis for allowing the reducing head to be moved relative to the vehicle between a raised position and a lowered position; and a position control arrangement that interfaces with the thrown object deflector and automatically moves the thrown object deflector relative to the cover portion at least when the reducing head is moved about the second axis to automatically control a thrown object trajectory angle of the reducing head.

9. The material reducing apparatus of claim 8, wherein the position control arrangement automatically moves the thrown object deflector relative to the rotary reducing component and the cover portion when the arm is moved about the first axis to automatically control the thrown object trajectory angle of the reducing head.

10. The material reducing apparatus of claim 9, wherein the position control arrangement automatically moves the thrown object deflector by a mechanical linkage that coordinates movement of the thrown object deflector with raising and lowering of the reducing head and also coordinates movement of the thrown object deflector with forward and backward tilting of the reducing head.

11. The material reducing apparatus of claim 10, wherein movement of the movable thrown object deflector is coordinated so as to ensure the thrown object trajectory angle of the material reducing apparatus does not exceed a predetermined angle relative to horizontal regardless of a tilt position of the reducing head and regardless of an amount the reducing head has been raised or lowered.

12. The material reducing apparatus of claim 11, wherein the thrown object trajectory angle does not exceed 6 degrees above horizontal.

13. The material reducing apparatus of claim 9, wherein the position control arrangement automatically moves the thrown object deflector by sensors and electronic control that coordinate movement of the thrown object deflector with raising and lowering of the reducing head and also coordinate movement of the thrown object deflector with forward and backward tilting of the reducing head.

14. The material reducing apparatus of claim 13, wherein the sensors continuously monitor data including a degree of tilt of the reducing head and a degree of raising and lowering of the reducing head, and convey the data to the electronic controller, wherein the electronic controller provides an actuation signal to an actuator to move the thrown object deflector to maintain the thrown object trajectory angle below a predetermined level relative to horizontal regardless of a tilt position of the reducing head and regardless of an amount the reducing head has been raised or lowered.

15. The material reducing apparatus of claim 9, wherein movement of the movable thrown object deflector is coordinated so as to ensure the thrown object trajectory angle of the material reducing apparatus does not exceed a predetermined angle relative to horizontal when: a) the reducing head is in the raised positon and also is in the backward tilt orientation; b) the reducing head is in the lowered position and also is in the backward tilt orientation; c) the reducing head is in the raised position and also is in the forward tilt orientation; and d) the reducing head is in the lowered position and also is in the forward tilt orientation.

16. A material reducing apparatus comprising:
a rotatable reducing component that carries a plurality of cutters;
a thrown object deflector and a cover portion, the cover portion covering a portion of a circumference of the rotatable reducing component, and the thrown object deflector being movable relative to the cover portion and also movable relative to the rotatable reducing component;
a pivot arrangement that includes a first pivot location that allows the reducing head to be pivoted between a forward tilt orientation and a backward tilt orientation, and also includes a second pivot location for allowing the reducing head to be moved between a raised position and a lowered position; and
a mechanical linkage that couples to the thrown object deflector and automatically moves the thrown object deflector relative to the cover portion at least when the reducing head is moved between the raised and lowered positions to automatically control a thrown object trajectory angle of the reducing head.

17. The material reducing apparatus of claim 16, wherein the mechanical linkage automatically moves the thrown object deflector relative to the rotary reducing component and the cover portion when the reducing head is moved between the forward and backward tilt orientations to automatically control the thrown object trajectory angle of the reducing head.

18. The material reducing apparatus of claim 16, wherein the mechanical linkage coordinates movement of the thrown object deflector with raising and lowering of the reducing head and also coordinates movement of the thrown object deflector with forward and backward tilting of the reducing head.

19. The material reducing apparatus of claim 18, wherein movement of the movable thrown object deflector is coordinated so as to ensure the thrown object trajectory angle of the material reducing apparatus does not exceed a predetermined angle relative to horizontal regardless of a tilt position of the reducing head and regardless of an amount the reducing head has been raised or lowered.

20. The material reducing apparatus of claim 18, wherein movement of the movable thrown object deflector is coordinated so as to ensure the thrown object trajectory angle of the material reducing apparatus does not exceed a predetermined angle relative to horizontal when: a) the reducing head is in the raised positon and also is in the backward tilt orientation; b) the reducing head is in the lowered position and also is in the backward tilt orientation; c) the reducing head is in the raised position and also is in the forward tilt orientation; and d) the reducing head is in the lowered position and also is in the forward tilt orientation.

* * * * *

UNITED STATES PATENT AND TRADEMARK OFFICE
CERTIFICATE OF CORRECTION

PATENT NO. : 10,086,382 B2
APPLICATION NO. : 14/640945
DATED : October 2, 2018
INVENTOR(S) : Harthoorn et al.

Page 1 of 1

It is certified that error appears in the above-identified patent and that said Letters Patent is hereby corrected as shown below:

On the Title Page

Item [57], Line 5: "can be titled about" should read --can be tilted about--

In the Specification

Column 2, Line 36: "is automatically refracted" should read --is automatically retracted--

Column 6, Line 64: "Refraction of the" should read --Retraction of the--

In the Claims

Column 14, Line 21, Claim 20: "in the raised positon" should read --in the raised position--

Signed and Sealed this
Twenty-first Day of May, 2019

Andrei Iancu
*Director of the United States Patent and Trademark Office*